(12) United States Patent
Luccini et al.

(10) Patent No.: US 11,913,857 B2
(45) Date of Patent: Feb. 27, 2024

(54) METHOD AND APPARATUS FOR ACOUSTICALLY DETECTING FLUID LEAKS

(71) Applicant: TENOVA GOODFELLOW INC., Mississauga (CA)

(72) Inventors: Marco Luccini, Etobicoke (CA); Vittorio Scipolo, Etobicoke (CA)

(*) Notice: Subject to any disclaimer, the term of this patent is extended or adjusted under 35 U.S.C. 154(b) by 0 days.

(21) Appl. No.: 17/570,796

(22) Filed: Jan. 7, 2022

(65) Prior Publication Data
US 2022/0128430 A1 Apr. 28, 2022

Related U.S. Application Data

(63) Continuation of application No. 16/491,744, filed as application No. PCT/CA2018/000033 on Feb. 22, 2018, now Pat. No. 11,255,743.
(Continued)

(51) Int. Cl.
*G01M 3/24* (2006.01)
*G01M 3/28* (2006.01)
(Continued)

(52) U.S. Cl.
CPC .................. *G01M 3/2807* (2013.01)

(58) Field of Classification Search
CPC .......... G01M 3/00; G01M 3/24; G01M 3/243; G01M 3/28; G01M 3/2807; G01M 3/32;
(Continued)

(56) References Cited

U.S. PATENT DOCUMENTS 3,652,070 A * 3/1972 Sagara ...................... C21B 7/10
266/46
5,134,876 A 8/1992 Robertson
(Continued)

FOREIGN PATENT DOCUMENTS

CA 3112869 4/2019
GB 2367362 A 4/2002
(Continued)

OTHER PUBLICATIONS

International Search Report prepared in respect of International Application No. PCT/CA2018/000033, dated May 18, 2018, ISA/CA Canadian Intellectual Property Office.
(Continued)

*Primary Examiner* — Nguyen Q. Ha

(57) ABSTRACT

A system used in monitoring one or more operating parameters of a coolant-fluid cooled industrial installation includes one or more an acoustic sensors positioned to receive and sense one or more acoustic signals in an installation coolant-fluid flow. The acoustic sensor assembly operates to emit and sense acoustic signals at frequency ranges above and/or below the background noise frequency ranges which are associated with the normal industrial installation operation. Output data signals representative of sensed acoustic signals are compared to target frequency profiles predetermined as representing an acoustic frequency associated with a predetermined installation operating parameter or event.

24 Claims, 19 Drawing Sheets

Related U.S. Application Data

(60) Provisional application No. 62/481,753, filed on Apr. 5, 2017.

(51) Int. Cl.
 *G01M 3/32* (2006.01)
 *G01N 29/04* (2006.01)

(58) Field of Classification Search
 CPC ............. G01N 29/00; G01N 29/04–14; G01N 29/34–52
 See application file for complete search history.

(56) References Cited

U.S. PATENT DOCUMENTS

| | | | |
|---|---|---|---|
| 5,361,636 A | 11/1994 | Farstad | |
| 5,388,445 A | 2/1995 | Walters | |
| 5,557,631 A | 9/1996 | Bulat et al. | |
| 6,389,881 B1 | 5/2002 | Yang | |
| 6,530,263 B1 | 3/2003 | Chana | |
| 7,266,992 B2 * | 9/2007 | Shamout | G01M 3/243 73/49.1 |
| 7,832,367 B2 * | 11/2010 | Valentas | F23M 11/00 373/76 |
| 7,940,189 B2 | 5/2011 | Brown | |
| 8,365,581 B2 | 2/2013 | Bühring | |
| 8,751,101 B2 | 6/2014 | Weber | |
| 2011/0093220 A1 | 4/2011 | Yang | |
| 2015/0184943 A1 * | 7/2015 | Abel | F27D 19/00 373/76 |
| 2016/0252422 A1 | 9/2016 | Howitt | |
| 2017/0307466 A1 | 10/2017 | Brennan, Jr. | |
| 2021/0318233 A1 | 10/2021 | Scipolo | |

FOREIGN PATENT DOCUMENTS

| | | |
|---|---|---|
| JP | H0S-118194 | 4/1994 |
| JP | H11-295179 | 10/1999 |
| JP | 6-118194 | 5/2000 |
| JP | 2005-265701 | 9/2005 |
| JP | 2017072448 A | 4/2017 |
| WO | WO 2002/077578 A1 | 10/2002 |
| WO | WO 2007/042277 A1 | 4/2007 |
| WO | WO 2012/159208 A1 | 11/2012 |
| WO | WO 2014/013362 A1 | 1/2014 |
| WO | WO 2015/145972 A1 | 10/2015 |

OTHER PUBLICATIONS

Written Opinion prepared in respect of International, dated May 18, 2018, ISA/CA Canadian Intellectual Property Office Application No. PCT/CA2018/000033.

Brennan, M.J. et al. "Some recent research results on the use of acoustic methods to detect water leaks in buried plastic water pipes." Institute of Sound and Vibration Research, University of Southampton (2008); p. 1 to 7.

Supplement European Search Report, dated Dec. 9, 2020; received from the European Patent Office in the prosecution Application Serial No. 18780613.8 (EPO Regional Phase).

Supplement European Search Report, dated Dec. 9, 2020; received from the European Patent Office in the prosecution Application Serial No. 18780613.8 (EPO Regional Phase application of PCT/CA2018/000033).

Written Opinion prepared in respect of International Application No. PCT/CA2018/000033 dated May 18, 2018, ISA/CA Canadian Intellectual Property Office, dated May 18, 2018, ISA/CA Canadian Intellectual Property Office.

Samuel Arnold, "Steelmaking Process Control Using Remote Ultraviolet Atomic Emission Spectroscopy", University of Toronto, 2015 (pp. ii to 80) (Source link: https://tspace.library.utoronto.ca/bitstream/1807/70210/3/Arnold_Samuel_201511_MAS_thesis.pdf).

* cited by examiner

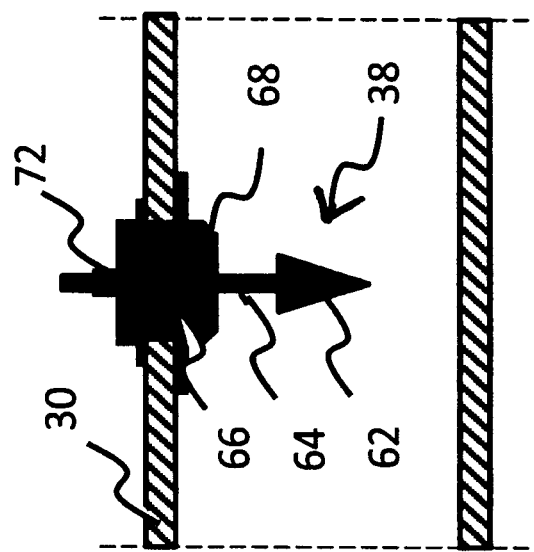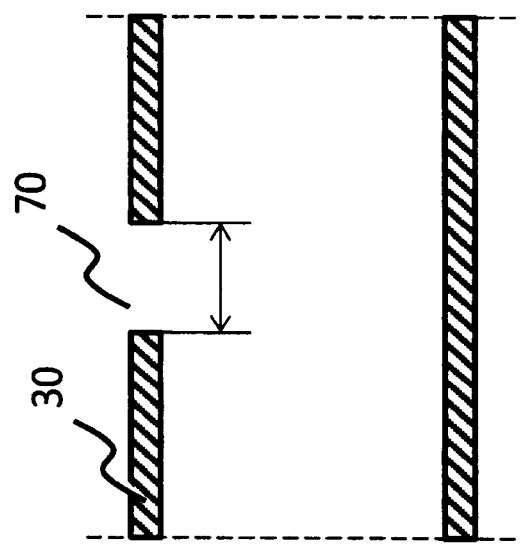

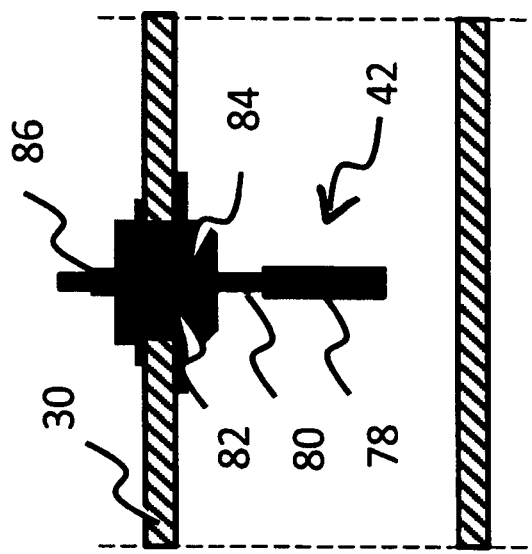

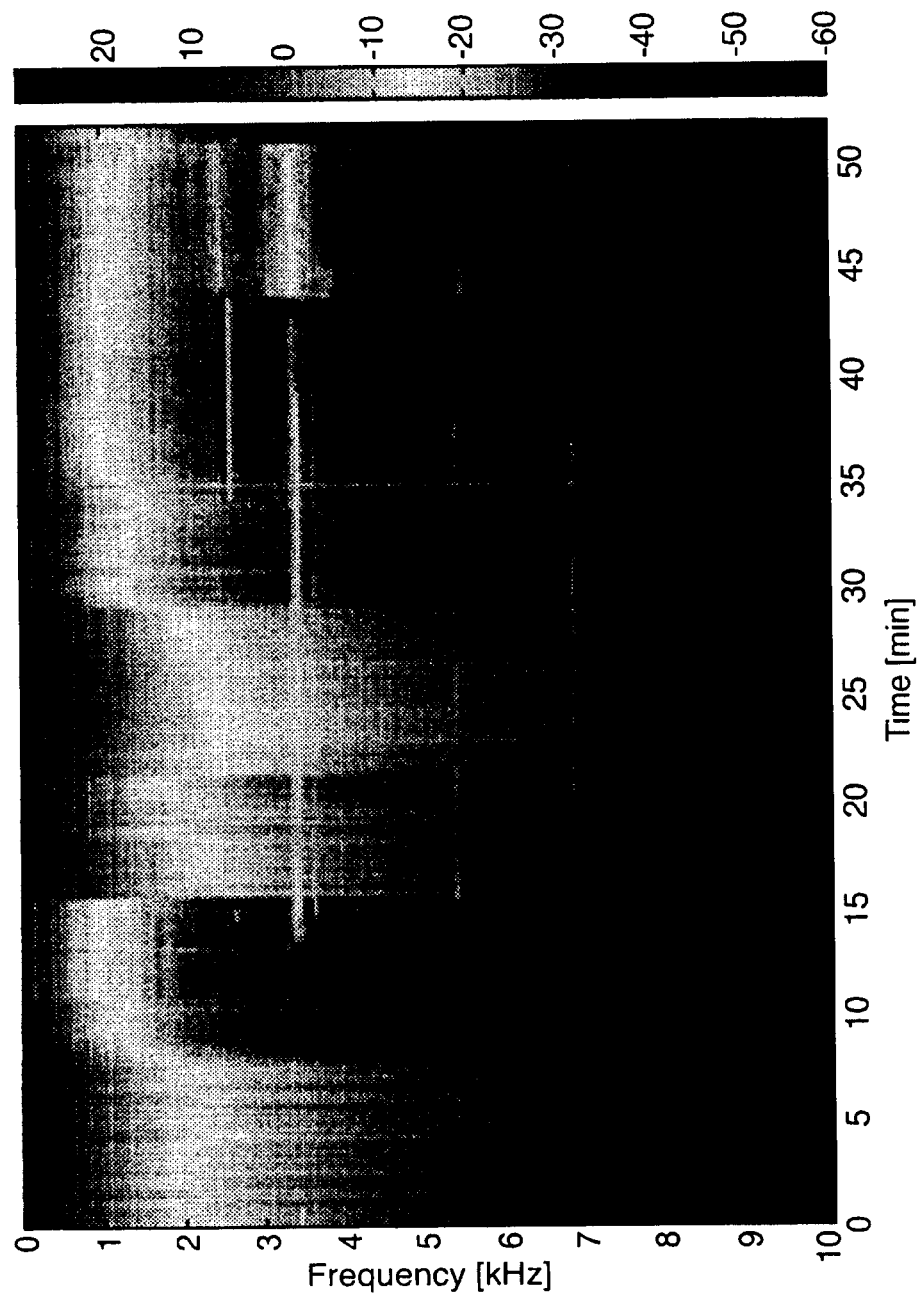

METHOD AND APPARATUS FOR ACOUSTICALLY DETECTING FLUID LEAKS

RELATED APPLICATIONS

This application is filed as a continuation of U.S. patent application Ser. No. 16/491,744 which was filed 6 Sep. 2019, the entirety of which is hereby incorporated herein by reference; and which has been submitted pursuant to 37 USC § 371 as the United States national phase entry of International Patent Application Serial No. PCT/CA2018/000033, filed 22 Feb. 2018, the entirety of which is hereby incorporated by reference.

This application claims priority and the benefit of 35 USC § 119(e) to U.S. Provisional Patent Application No. 62/481,753, filed 5 Apr. 2017, and which is incorporated herein by reference in its entirety.

SCOPE OF THE INVENTION

The present invention relates to a monitoring and detection system for monitoring the operating parameters of fluid contained and flowing in a pipe or channel. More preferably, the invention relates to a method and apparatus for detecting leaks in a pipeline of a fluid distribution systems in industrial applications, and more preferably an apparatus operable to provide the acoustic detection of fluid leaks in conduits, or pipes, such as water leaks which occur due to cooling panel fractures in steel making furnaces, such as Electric Arc Furnace (EAF).

BACKGROUND OF THE INVENTION

In the most preferred EAF steel making application, fluid or water cooled panels have been introduced to protect the upper-shell, roof and side-walls of furnaces from the extreme heat generated by the melted steel and radiation from the electric arc. The excellent results achieved led to a wide spread use of this solution. However, the introduction of water cooled panels has introduced the risk of water leaking into the furnace from damaged panels. In particular, coolant panel structures are provided with one or more serpentinely extending cooling pipes or conduits in thermal contact with the sidewalls of the furnace. Water is circulated through the cooling pipes as a coolant-fluid to effect furnace cooling and dissipate heat. The coolant panels are subject to strong thermomechanical stress due to the extreme heat variations inside the furnace and the impact of scrap during the EAF charge phases. Eventually, due to the expansion/contraction process, heat stress and scrap impact, the panel structure can crack leading to water spilling directly into the furnace.

When liquid water enters the EAF, it will immediately begin to boil producing steam ($H_2O$ vapor). The evolving $H_2O$ vapor can subsequently form a gas-blanket around the liquid water, thereby reducing heat transfer and prolonging boiling for an extended time period. An explosion risk exists whenever there is molten slag and metal in the furnace, however, this may become particularly acute if there is a sudden disturbance such as from unmelted scrap falling into the pool or when the EAF is rocked or tilted. The resulting molten "slosh" can readily submerge liquid water below molten slag and steel.

In such slosh situations there can often be two explosions, the first explosion related to a sudden evolution of steam trapped subsurface which ejects molten metal and slag, and a possible second much more severe explosion due to rapid ignition of combustible gases CO and $H_2$ present inside the EAF. In this regard, the concentration $H_2$ in the EAF freeboard maybe elevated due to reduction of $H_2O$ stemming from the water leak.

It has been recognized that the commercialization of effective, real-time EAF water leak detection technology would represent an important safety tool for all EAF shops. The development of such technology on a reliable level has proven difficult.

Typically the detection of water leaks in EAF furnaces is based on a visual inspection of the furnace during furnace shut down. This practice relies only on the expertise of the EAF operator and may be susceptible to human error. Automated systems to detect leaks from water-cooled panels have been proposed, including the monitoring of pressure/flow of the water cooling system, the analysis of humidity in the furnace off-gases, and vibration analysis of the panel structure.

Direct measurement of inlet/outlet water flow has been proposed for detecting water leaks. Experience has shown that a simple global in/out flow measurement is prone to high signal noise and poor response times. Regarding the pressure/flow monitoring of the water-cooling system, typically the furnace water panels are a sub-system of a more complex plant cooling scheme. Significant variations in flow and pressure occur due to the normal plant operations and the effect of a water leak can be masked in the normal pressure/flow behaviour. Under such situations, increased effectiveness for water leak detection requires multiple cooling water circuits in the shell, with each panel in the circuit being equipped with flow, temperature and pressure sensors, see for example L. S. Valentas and E. P. Tierney, U.S. Pat. No. 7,832,367, the disclosure of which is incorporated herein by reference in its entirety. The resulting large scale sensor network increases system complexity which can affect reliability, maintenance and capital cost.

The analysis of humidity in the furnace exhaust gases has also been proposed as a detection method. Because the by-product of a water leak are gaseous ($H_2$ and $H_2O$ vapor), off-gas analysis can be an effective and rapid response method for EAF water detection. Such off-gas analysis systems must be capable of providing reliable and accurate analysis of both $H_2$ and $H_2O$ vapor in the off-gas. Many "normal" sources of $H_2O$ vapor exist in the off-gas, including combustion products from residual oils remnants from the scrap material charged into and from fuel fired burners, as well as from moisture on the scrap and water sprays normally used to cool the electrodes. As such, it has been appreciated that off-gas water leak detection system is preferably equipped with software that can distinguish between these "normal" levels of $H_2$ and $H_2O$ vapor in the off-gas chemistry, and "abnormal" levels associated with a water panel leak. Heretofore, a major limitation of conventional off-gas analysis techniques used in the detection of water vapour remains developing software that can reliably differentiate actual water-leaks from such normal humidity variations generated by the process and typical furnace operations, while maintaining an acceptable false alarm rate for water leaks.

A detection system based on vibration analysis provided by fluid travelling in the panel structure has recently proposed by Lumar Metals and which is described in International Patent Publication No. WO2014013362A1, the disclosure of which is incorporated herein by reference in its entirety. This methodology relies on the use of piezoelectric sensors which are installed in a direction of forward fluid flow with a refrigerated pipe. The system monitors the turbulence behaviour of water that is fed through refrigerated pipes. In operation, before the system start-up, a detailed survey of the vibrational standard behaviour of the system is determined. When the piezoelectric sensors detect a change in such vibrational behaviour, the software analyzes the disturbance to determine if it is from a water leak. The vibrational noise produced by the leak is compared to the flow noise occurring in "normal conditions", consequently generating an alarm when a significant difference is detected. It has been appreciated that a main limitation of this approach consists in the significant vibrational noise of the EAF environment, which might mask the leak appearance.

SUMMARY OF THE INVENTION

The common feature of all applications for the current invention includes detection of fluid leaks in a pipe or channel. One non-limiting object of the current invention is therefore to provide an improved apparatus and methodology to be used to audibly monitor one or more operating parameters associated with the fluid contained in pipes or channels. More preferably, the system provides an apparatus operable to audibly detect a leak event in a pipe, channel, or fluid conduit used for cooling furnace sidewall panels, fume duct panels and in lances, tuyeres or other ancillary cooled equipment and which for example may be used in but not limited to industrial furnaces, such as furnaces used in the iron making and the steel making industries.

Another non-limiting object is to provide a leak detection device for a fuel or oil pipeline, duct or other fluid conduit, and which reduces the limitations and disadvantages of prior leak detection devices/solutions, and preferably those used in cooling circuits of industrial applications such as in panels, ducts, lances, tuyeres, metal casting moulds or the like and most preferably those used to respond to the problem of water leak detection in an EAF or other metallurgical furnaces where a serious explosion threat exists if liquid water comes in contact with molten metal.

A further non-limiting object of the current invention addresses the need to obtain a fast and reliable detection of a panel water leak due to a mechanical fracture of an EAF or other industrial furnace cooling panel structure. To overcome at least some of the disadvantages associated with prior art systems, the present invention provides for a monitoring and/or detection system which may be used in monitoring one or more operating parameters of a coolant-fluid industrial installation audibly. The monitoring and/or detection system includes an acoustic sensor assembly which is positioned and configured to transmit, receive and sense one or more acoustic signals in the installation coolant-fluid flow. More preferably, the acoustic sensor assembly includes one or more acoustic sensors which are positioned in the fluid, and most preferably which include one or more respective signal transmitting elements and one or more signal receiving elements both of which are disposed directly within the coolant-fluid flow, and where the acoustic sensor assembly is selected to transmit and sense acoustic signals at frequency ranges above and/or below the background noise frequency ranges which are associated with the normal or typical operation of the installation.

More preferably, the acoustic sensor assembly operates to both transmit and receive acoustic signals which are representative of the propagation conditions in the circuit in which the fluid is flowing. The sensed acoustic signals comprise target frequencies emitted by the system away from the background noise, as well as the background noise within the flow. Data are sent to a processor which operates to compare data signals received from the acoustic sensor assembly with one or more target frequency profiles. The target frequency profiles are preferably predetermined as representing the acoustic frequencies associated with the transmitted known signal. Additional acoustic frequencies are associated with a predetermined installation operating parameter or event, and which may include without limitation, a frequency associated with normal installation start-up and/or shutdown procedures; a frequency associated with normal or optimum installation run operations as well as frequencies associated with a particular installation hazard, such as a vessel rupture, water leak, or the like. The processor is operable to compare one or more frequency components of the sensed acoustic signal detected by the acoustic sensor assembly with one or more of the predetermined target frequencies associated with the transmitted signal and installation operating parameters, and output warning and/or control signals where a compared frequency component deviates from its target frequency by a predetermined threshold amount.

More preferably, the present invention provides a method and apparatus for the detection of fluid leaks from conduits and pipes, and more preferably coolant-fluid leaks occurring in industrial applications using cooling panels and other ancillary equipment such as but limited to ducts, lances, tuyeres, casting moulds and the like and most preferably in metallurgical furnaces such as a steelmaking EAF furnace and BOF furnace.

The applicant has appreciated that providing an acoustic sensor assembly which operates to detect and/or sense transmitted known acoustic signals in a coolant-fluid flow of an installation cooling-fluid conduit, advantageously incident background noises which could lead to false readings may be reduced. In particular, the applicant has recognized that a coolant-fluid flow and in particular, a coolant-flow through cooling panels or channels such as those used in steel making applications advantageously may provide a more direct signal path to the steel making furnace or ancillary equipment. By detecting the known emitted audio signals transmitted through the coolant-fluid flows, it is possible to not only monitor the propagation path between the transmitted and the receiver and the ongoing operations of the furnace, but also detect furnace anomalies audibly, whilst achieving reduced interference from ambient noise signals. In one embodiment, the current invention provides an apparatus and method of leak detection based at least in part on the following principles:
  the possibility for a transmitted acoustic wave to travel into and/or along a moving flow of coolant water or other fluid flow; and
  the fact that any discontinuity occurring in the cooling conduit or pipe infrastructure, such as a leak or in the conveyed fluid, produces or influences acoustic transients in the transmitted acoustic wave which propagate as wave anomalies or variabilities within the coolant-fluid flow.

In one non-limiting embodiment, the present invention provides a system for monitoring the operation of a coolant-fluid cooled industrial installation, such as an industrial furnace and which is operable to identify acoustically both planned and unexpected installation operating parameters. The applicant has appreciated that by monitoring changes in the detected acoustic frequency, it is possible to monitor both anticipated ongoing operating parameters of the furnace, as well as detect maintenance or safety issues which could arise. In a simplified construction, the system is provided with an acoustic sensor assembly having one or more acoustic sensors which are positioned in and/or along one or more fluid conduits which in the most preferred application are provided in thermal contact with furnace part of the installation to be cooled. The acoustic sensor assembly is adapted to transmit and receive electronically data representative of acoustic signals which propagate through the fluid for processing. Preferably, the acoustic signals selected for processing are chosen with a frequency either below or more preferably above a determined background noise of the installation.

The applicant has appreciated that most installations, during their normal operation cycle, will by their operation emit background operating noise within an identifiable range. By way of example, it has been recognized that in the case of industrial steel furnaces such as an electric arc furnace (EAF furnace) the EAF furnace operating under normal conditions will emit acoustic noise signals with a frequency in the range of between 0 to less than 10 kHz. Similarly, the determination of the background noise frequency emitted by other individual industrial furnaces and/or ancillary equipment and other installations during their typical or optimum day-to-day operation may be easily identified through basic audio monitoring techniques.

The applicant has appreciated that it is possible to monitor acoustically not only the normal operation parameters of industrial furnaces, and which in the case of EAF furnaces would for example include melting and charging operations, but also using acoustic sensors to identify abnormal or potentially dangerous furnace operating parameters, such as water leaks, incomplete or ineffective oxygen and/or furnace fuel injection or input, and/or incomplete combustion and/or reaction. In a preferred aspect, it is envisioned that on detecting an abnormal operation event, the system would output an appropriate signal to notify an operator or more preferably initiate automatic safety protocols and/or adjust furnace controls or inputs to mitigate or ameliorate any defects or hazards.

More preferably, the invention provides a system and method of assessing fluid conduit and/or panel structure integrity by monitoring the acoustic response and/or variabilities of the fluid flow travelling inside the panel. Most preferably, the invention provides a system having at least one, and preferably two or more hydrophones or vibroacoustic sensors, which operate as audio transducer/receivers. The audio sensors are placed on, and more preferably within the conduit or pipe structure to be monitored, and preferably in contact with the travelling cooling fluid. To minimize background noise associated with fluid turbidity as the fluid flows through the conduit or pipe, the system most preferably operates so that the flow of fluid along the pipe is provided without an air space, and whereby the fluid is not provided as a free-surface or open channel flow. The applicant has appreciated that providing the fluid flow as a free-surfaceless pipe flow advantageously may minimize air entrainment and in-pipe turbidity which disadvantageously may result in the generation of undesirable secondary noise or acoustic signals.

In one embodiment, a system is operable whereby any deformation or defect occurring in the guiding conduit or structure along which fluid flow travels will affect the flow propagation characteristics and, consequently, pressure or audio waves travelling within the fluid itself. As such, by monitoring and detecting changes or variations in signals or waves transmitted along, through and/or across the fluid conduits at preselected acoustic frequencies, fluid leaks and flow irregularities may be identified.

In another embodiment, one or more acoustic transmitters or emitters are placed along, or more preferably directly within a fluid conduit or pipe, such as but not limited to the cooling fluid conduit of an industrial furnace cooling panel. The acoustic emitters are preferably omnidirectional transmitters, however linear and/or directional signal transmitters could also be used and operate to emit an output acoustic signal. One or more acoustic sensors are positioned along and preferably within the fluid conduit a distance from the signal transmitter to detect and sense the emitted acoustic signal. Most preferably at least an acoustic sensor is positioned at a downstream location spaced towards a mid-portion of the fluid flow stream, and separated a distance from the fluid conduit sidewall. Such positioning may advantageously reduce background noise issues associated with pipe and/or furnace cooling panel vibration.

In further embodiments, the system may operate whereby an acoustic signal emitter or transmitter assembly emits a known acoustic signal (waveform) or sound at one or more selected frequencies or frequency bands. An acoustic sensor assembly is operable to detect a preselected baseline frequency which is related to the emitted signal. In one possible operational mode, the acoustic sensors are operable to detect a change in one or more frequency or frequency bands in the emitted audio signal, or the presence of secondary acoustic frequencies or signals as an indicator of the presence of a fluid leak.

In one non-limiting embodiment, the acoustic transmitter or emitters are operable to emit one or more output acoustic signals at frequencies which are correlated to the resonance frequency of the fluid conduit or pipe. In one possible mode, the acoustic signals are output by the acoustic emitters at frequencies selected to preferentially propagate along the fluid conduit or pipe, so as to provide comparatively strong signal profile at one or more of the system audio transducer/receivers. The signal frequencies of the output signals may, in one possible simplified embodiment, be preselected by acoustic testing and/or experimental modelling to pre-identify frequency ranges which exhibit optimum propagation characteristics for a selected fluid conduit or pipe geometry or configuration.

In an alternate possible embodiment, the system may operate with the acoustic emitters and audio transducer/receivers to automatically initialize and/or recalibrate and select optimum frequencies for output and detection. In one non-limiting mode of operation, on initialization, and preferably also on a pre-set period of recalibration, the acoustic emitters operate to output a number of different test acoustic signals across a frequency spectrum range. In one mode, individual output frequencies may range from about 10 kHz to about 75 kHz at 1 to 5 kHz increments. The individual test output signals propagating along the pipe or conduit are respectively sensed by the system audio transducer/receivers. The signal strength of each individual test signal profile is then compared against one another, as for example by a system processor and memory. One or more preselected baseline frequencies are chosen on the basis of their propagation strength or other characteristics. In one possible mode, selected baseline frequencies for output are preferably chosen as signal frequencies which exhibit on a relative basis either stronger, or the strongest signal propagation along the fluid conduit or pipe between the signal emitters and the audio transducer/receivers. In an alternate possible mode, baseline signal frequencies may be preselected for output as the signal frequencies which provide a signal strength which exceeds an average or median signal strength of all test acoustic signals by a minimum threshold amount.

Optionally, following the initialization and/or recalibration of the system to identify the preselected optimum baseline frequencies, the acoustic signal emitter may be actuated to emit as the known acoustic signal, a signal tailored to the baseline frequency. In one mode, the acoustic sensors may be operable to detect in the specific baseline frequency which is directly output. In an alternate possible mode, the system may act in conjunction with the acoustic sensors to detect a change in the output main baseline frequency ($f_0$) and/or one or more of its associated harmonic frequencies (i.e. $f_2=2\ f_1$; $f_3=3f_1$; and higher multiple harmonics).

In a further operational mode, the system is operable to emit the acoustic signal at a first location and having the preselected baseline frequency. The audio sensor assembly detects the emitted signal at a second location and outputs data signals used to identify when a selected component of the baseline frequency deviates from a preselected target or normal frequency by a threshold amount. On identifying such an occurrence, output to a user or a control system, a signal indicative of a particular installation operating parameter, and most preferably the presence of a likely cooling panel or conduit leak. Preferably, the system is operable to detect the emitted baseline frequency and identify whether one or more preselected frequency peaks thereof rises or lowers by a preselected threshold amount which is indicative of a possible conduit leak. The system may operate whereby the identification of one or more sensed target frequency peaks increases and/or drops by a factor of at least 2, preferably at least 5, and most preferably at least about 10 is used to indicate a potential leak.

Most preferably, the system is operable to detect water leaks in an EAF cooling panel or the like. Preferably, the system is provided with an audio signal emitter which is used to transmit an emitted audio signal with a target frequency range which is selected below, and more preferably above the background noise frequency of the EAF furnace. In a most preferred construction, the audio signal emitter is configured to emit and propagate the output audio signal along a cooling pipe of the cooling panel at a location spaced upstream from the audio system sensors.

It is further recognized that another embodiment of the present system the acoustic emitter transmitter assembly and/or the acoustic sensor assembly can each be extended to include multiple coupled signal emitters or transmitters and/or individual acoustic sensors or transducers.

Without limitation, the present invention thus provides various aspects, and which include:

1. A fluid leak detection system for detecting a fluid leak and preferably a coolant fluid or water leak, in a circuit assembly of an industrial furnace and/or ancillary equipment such as lances, tuyeres, casting moulds and the like; said circuit assembly including a conduit for receiving a flow of cooling fluid therealong, said cooling fluid thermally communicating with a portion of the equipment to be cooled, an acoustic emitter operable to emit and propagate an output acoustic signal along at least part of said conduit, said output acoustic signal including one or more preselected baseline frequency components in a frequency range selected above a background noise frequency of the industrial installation, an acoustic sensor(s) for receiving and sensing the emitted acoustic signal at a location along said conduit spaced from said acoustic emitter, the acoustic sensor operable to output data signals representative of the sensed emitted acoustic signal, a processor electronically communicating with said acoustic sensor, the processor including programme instructions operable to, compare whether one or more of the at least one baseline frequency components of the sensed emitted acoustic signal deviates from a respective preselected target frequency by a threshold amount; and on identifying the at least one compared baseline frequency component as deviating from the preselected target frequency by the threshold amount, outputting at least one of a signal indicative of a potential coolant fluid leak, and a control signal to effect a pre-selected safety protocol.

2. A monitoring and detection system for monitoring operating parameters of a fluid in an industrial application and/or installation, the industrial application and/or installation comprising a fluid conduit receiving a flow of fluid therealong, an acoustic emitter operable to emit and propagate an output acoustic signal along at least part of said conduit, said output acoustic signal including one or more preselected baseline frequency components in a frequency range selected above a background noise frequency of the industrial application, an acoustic sensor assembly disposed to receive and sense the emitted acoustic signal in said fluid flow, the sensed acoustic signal being in a frequency range above or below a background noise frequency range associated with the industrial application and/or installation, the acoustic sensor assembly operable to output data signals representative of the sensed acoustic signals, a processor electronically communicating with said acoustic sensor assembly, the processor including memory and programme instructions stored in memory operable to compare at least one frequency component of the sensed acoustic signal with at least one predetermined target frequency associated with an installation operating parameter, and where the compared frequency component of the sensed acoustic signal deviates from the target frequency by a threshold amount, generate an output signal indicating an operating status of the associated operating parameter and/or for controlling an operation of said industrial application and/or installation.

3. A water leak detection system for detecting a water coolant leak in a cooling panel of an electric arc furnace (EAF); said cooling panel including a cooling fluid conduit thermally communicating with a portion of the EAF to be cooled, the cooling-fluid conduit receiving a flow of water as a coolant flow therein, an acoustic emitter operable to emit an output acoustic signal into said coolant flow at a first location along said conduit, said output acoustic signal including a preselected baseline frequency component in a frequency range selected at between greater than about 10 kHz to about 100 kHz, and preferably between about 40 kHz to 75 kHz, an acoustic sensor assembly including at least one acoustic sensor disposed at a second location along said conduit spaced from said first location, said acoustic sensor operable to sense the emitted acoustic signal in said coolant flow and output data signals representative of the sensed emitted acoustic signal at the second location, a processor electronically communicating with said acoustic sensor assembly, the processor having memory and programme instructions stored in said memory operable to, compare whether the baseline frequency component of the sensed emitted acoustic signal deviates from preselected target frequency stored in said memory by a threshold amount; and on identifying that the compared baseline frequency component deviates from the preselected target frequency by the threshold amount, output at least one of a signal indicative of a potential water coolant fluid leak in the cooling panel and one or more control signals operable to effect an automated safety protocol for the EAF.

A system in accordance with any of the aforementioned or hereafter described aspects, wherein the preselected baseline frequency component of the output acoustic signal is preselected having regarding to the resonance frequency of the at least part of the conduit.

A system in accordance with any of the aforementioned or hereafter described aspects, wherein the preselected baseline frequency component has a signal frequency selected to preferentially propagate along said flow of a fluid, and preferably a cooling fluid.

A system in accordance with any of the aforementioned or hereafter described aspects, wherein said output acoustic signal comprises a pulsed signal having a pulse duration selected at between about 0.25 and 3 minutes, preferably 0.5 to 1 minutes, and a pulse repetition cycle of between about 1 to 5 minutes.

A system in accordance with any of the aforementioned or hereafter described aspects, wherein said processor includes memory, said preselected target frequencies being stored in memory, and said programme instructions further operate to perform on the sensed emitted acoustic signal at least one of signal amplification, time-series analysis, Fourier Transform (including short Fourier Transform), time-frequency analysis, spectral analysis, filtering theory, signal auto and cross correlation.

A system in accordance with any of the aforementioned or hereafter described aspects, wherein said industrial installation or furnace comprises an electric arc furnace (EAF), said cooling assembly comprises an EAF cooling panel, and said cooling fluid comprises water, the background noise frequency of the electric arc furnace being less than about 10 kHz, wherein the preselected baseline frequency components comprise target frequency bands is in a frequency range greater than about 10 kHz, preferably between about 10 kHz to about 100 kHz, and most preferably between about 40 kHz to about 75 kHz.

A system in accordance with any of the aforementioned or hereafter described aspects, wherein said flow of fluid along said conduit comprises a substantially free-surfaceless pipe flow, and wherein said acoustic emitter is positioned to emit said output acoustic signal within a central portion of said flow of fluid A system in accordance with any of the aforementioned or hereafter described aspects, wherein said acoustic sensor is positioned to receive and sense said emitted acoustic signal within said central portion flow of fluid at a location downstream from said acoustic emitter.

A system in accordance with any of the aforementioned or hereafter described aspects, wherein said conduit comprises a generally serpentine conduit segment, having a fluid inlet end portion and a fluid outlet end portion, the acoustic emitter being disposed in said fluid flow at a first upstream location proximate to the fluid inlet portion, and the acoustic sensor is disposed in said fluid flow at a second location spaced downstream from said first location spaced towards the outlet end portion.

A system in accordance with any of the aforementioned or hereafter described aspects, wherein said acoustic sensor is spaced along said conduit a distance that is commensurate with the application and in the most preferred application of between about 5 and 50 meters, and preferably 10 to 30 meters, from said acoustic emitter.

A system in accordance with any of the aforementioned or hereafter described aspects, wherein the operating parameter is selected from the group consisting of a potential interruption in the flow of fluid and a potential loss of fluid, the system further including an acoustic emitter positioned to emit said acoustic signal as an emitted output acoustic signal within said fluid flow, the emitted output acoustic signal including a preselected baseline frequency component, the preselected baseline frequency component being selected above the background noise frequency range, and wherein the programme instructions are operable to compare said baseline frequency component of the sensed emitted acoustic signal with the at least one predetermined target frequency; and on identifying the compared baseline frequency component as deviating from the at least one predetermined target frequency by the threshold amount, the processor generating as the output signal, a signal indicative of the potential loss of fluid.

A system in accordance with any of the aforementioned or hereafter described aspects, wherein said acoustic sensor assembly includes an acoustic sensor positioned to receive and sense said acoustic signals within said fluid flow at a location downstream from said acoustic emitter.

A system in accordance with any of the aforementioned or hereafter described aspects, wherein said fluid conduit comprises a generally serpentinely extending conduit having a fluid inlet end and a fluid outlet end, the acoustic emitter being disposed towards said fluid inlet end, and the acoustic sensor assembly being disposed towards the fluid outlet end, and wherein flow of fluid comprises substantially free-surfaceless pipe flow.

A system in accordance with any of the aforementioned or hereafter described aspects, wherein the industrial installation comprises a steel making furnace, and said coolant-fluid comprises water, and/or the operating parameters associated with the predetermined target frequencies being one or more selected from the group consisting of a carbon injection effect, a lance oxygen injection flow, a furnace combustion gas flow, and a cooling water leak.

A system in accordance with any of the aforementioned or hereafter described aspects, wherein the operating parameters include steel furnace operating parameters selected from the group consisting of carbon injection effects, oxygen injection flow, and furnace combustion gas flow.

A system in accordance with any of the aforementioned or hereafter described aspects, wherein the industrial installation comprises industrially cooled equipment such as furnaces, lances, injectors, fume ducts, tuyeres, panels, casting moulds, fluid compressors and the like and said coolant-fluid comprises water or the like, and the operating parameters associated with the predetermined target frequencies being one or more selected to determine a coolant-fluid leak.

A system in accordance with any of the aforementioned or hereafter described aspects, wherein said processor is operable to perform on the output data signals at least one of signal amplification, time-series analysis, Fourier Transform (including short Fourier Transform), time-frequency analysis, spectral analysis, filtering theory, signal auto and cross correlation. A system in accordance with any of the aforementioned or hereafter described aspects, wherein said fluid conduit comprises a serpentinely extending conduit portion, having an upstream inlet end portion and a downstream outlet end portion, and said flow comprising a substantially free-surfaceless flow.

A system in accordance with any of the aforementioned or hereafter described aspects, wherein said acoustic emitter comprises a transducer provided for positioning at a substantially central portion of the flow, and said at least one acoustic sensor includes a respective signal receiving portion disposed at said central portion of said flow.

A system in accordance with any of the aforementioned or hereafter described aspects, wherein said sensor assembly includes a plurality of said acoustic sensors spaced at different locations along said conduit.

A system in accordance with any of the aforementioned or hereafter described aspects, wherein said system is operable on one or more of system initialization and periodic system recalibration to;

actuate said acoustic emitter to output a plurality of test acoustic signals, each of said test acoustic signals having an associated signal frequency, detect the test acoustic signals with one or more of the acoustic sensors, and compare the detected test acoustic signals, to identify the associated acoustic signal frequencies which are correlated to the resonance frequency of the conduit.

A system in accordance with any of the aforementioned or hereafter described aspects, wherein the target frequency bands and/or the baseline frequency component is in a frequency range selected at between about 48 and about 70 kHz.

A system in accordance with any of the aforementioned described aspects, wherein on identifying the acoustic signal frequencies correlated to the resonance frequency, the system outputting the emitted output acoustic signal at the identified acoustic frequency.

BRIEF DESCRIPTION OF THE DRAWINGS

Reference may now be had to the following detailed description taken together with the accompanying drawings, in which:

FIGS. 7a and 7b illustrate schematically a partial cross-sectional view showing the mounting of the signal emitter/transducer shown in FIG. 6 in the sidewall of a cooling-fluid conduit pipe of the cooling panel shown in FIG. 2;

FIGS. 9a and 9b illustrate schematically a partial cross-sectional view showing the mounting of the acoustic receiver/sensor of FIG. 9 in the sidewall of the cooling-fluid conduit pipe;

FIG. 11 shows graphically the monitored background frequency sound pattern which is emitted by the EAF furnace shown in FIG. 1 during conventional EAF furnace operations;

DETAILED DESCRIPTION OF THE PREFERRED EMBODIMENTS

The description below describes the methodology for the acoustic leak-detection system design in the preferred embodiment. It is understood that a similar methodology is applicable for design of acoustic leak-detection systems for other embodiments.

Figure 1:
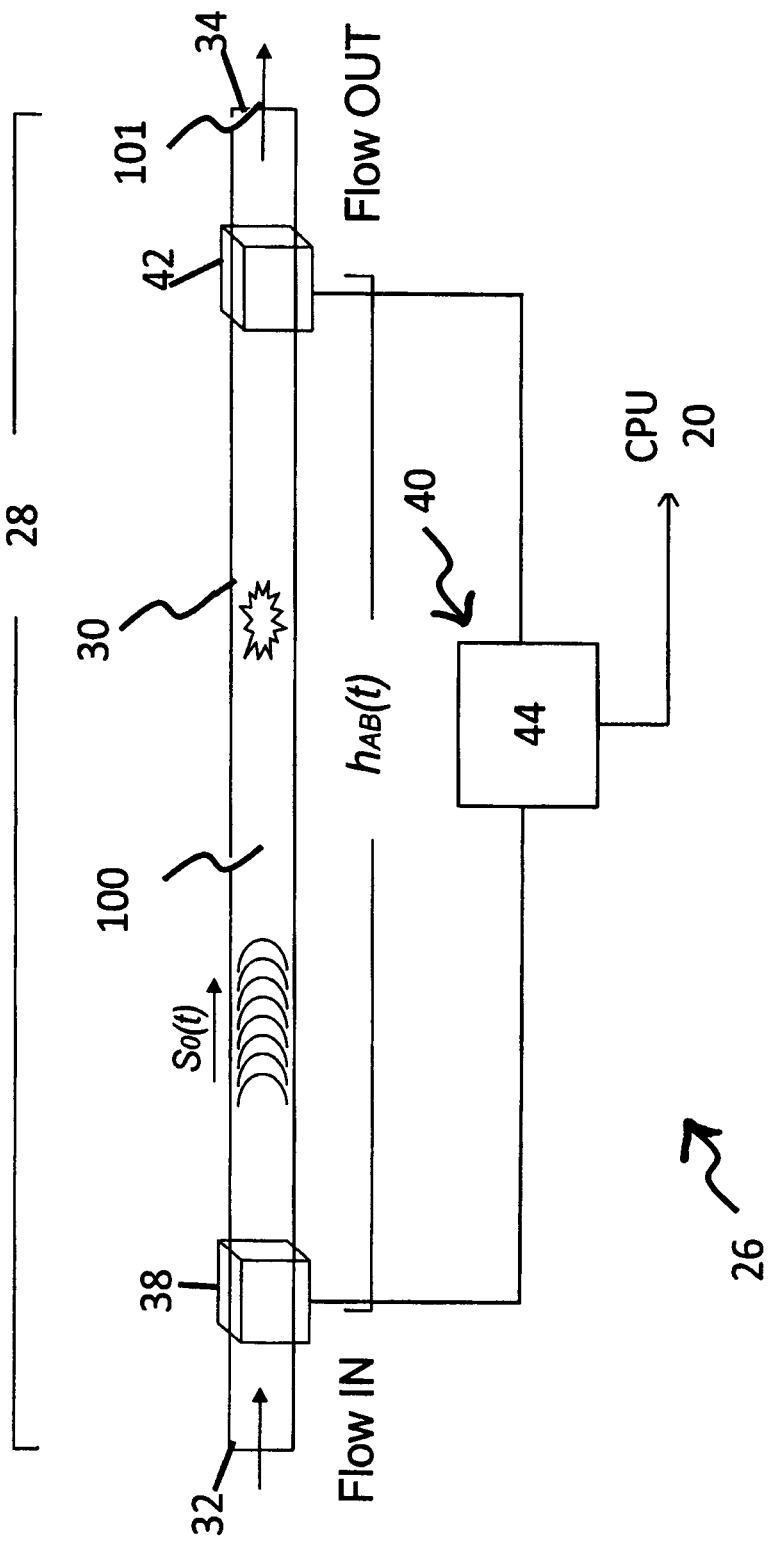
FIG. 1 illustrates schematically the operation of the system in detecting cooling fluid water leaks in accordance with the first embodiment of the invention.

Reference may be had to FIG. 1, in which a leak detection system 26 is shown; as respectively including an acoustic signal emitter 38 and an acoustic signal receiver assembly 40 which includes at least one acoustic receiver or detector 42. The acoustic detector 42 and emitter 38 are preferably spaced along a conduit 28. Although not essential, the detection system 26 preferably includes a sensor system processor 44. In a non-limiting aspect the sensor processor 44 may be provided as part of the acoustic signal receiver assembly 40, and which preferably electronically communicates with and controls both the acoustic signal emitter 38 and the acoustic signal detector 42. More preferably, the sensor system processor 44 is further provided in electronic communication with a control CPU 20 and operates to output data signals thereto which are representing sensed audio signal components. The signal emitter 38 is preferably selected to generate audio or acoustic signals at one or more preselected target frequencies. Most preferably, the emitter 38 operates to emit an acoustic signal $s_0(t)$ in a target frequency range of between about 10 to 100 kHz and preferably about 40 to 75 kHz as a pulsed signal which is cycled with a pulse duration selected between about 0.25 and 5 minutes, and preferably about 1 to 3 minutes.

The target frequency ($f_0$) is most preferably preselected to preferentially propagate along the cooling-fluid conduit 28 having regard to the resonance frequency of the pipe 30. The target frequency ($f_0$) may be preselected by individually emitting and sensing a series of test signals at different known frequencies to identify frequencies which provide distinct, and preferable strongest signal propagation between the emitter 38 and detector 42. In an alternate embodiment, upon initial activation and/or on a timed or forced recalibration, the acoustic signal emitter 38 may be actuated to emit a series of test signals, with each having an associated signal frequency. Test signals may be output in 1 to 5 kHz frequency increments over a signal spectrum range ranging from between 10 kHz to 100 kHz. On the signal detector 42 sensing and outputting to the CPU 20 data signals representative of each test signal, the CPU 20 may be activated to automatically select the particular acoustic test signal $S_{o(t)}$ as having the optimum target frequency for use. In one mode the test signal selected is chosen as the signal frequency which exhibits satisfactory propagation characteristics along the cooling-fluid conduit 28. Such characteristics may for example include, without limitation, signal frequencies which exhibit the strongest signal propagation between the signal emitter and signal detector, compared to a remainder of the test signals tested, and/or test signals at signal frequencies which have detected signal strengths which exceed the median or mean signal strength of the detected test signals by a threshold amount.

The signal receiver 42 is provided as a vibroacoustic sensor selected to receive vibrational and acoustic signals in the target frequency range generated by the signal emitter 38, to allow a comparison between any change in the known baseline source signal and the detected signal profiles. The signal emitter 38 is preferably mounted in proximity to the fluid inlet 32, and is positioned to emit output acoustic signals at a mid-portion of the water flow 101. The signal receiver 42 is preferably positioned upstream and adjacent to the fluid outlet 34, and so as to detect and receive acoustic signals at the mid-portion of the water flow 101.

As shown in FIG. 1, the fluid circulation system is activated to circulate the cooling water flow 101 through the conduit 28 so as to move along the flow path 100. Concurrently, the sensor processor 44 is used to activate the signal emitter 38 to emit preselected acoustic signal $s_0(t)$ from the signal emitter 38 for a pulse duration between 0.25 second to 1 minute and a pulse cycle repetition between 1 and 5 minutes. The signal receiver 42 is concurrently activated to receive and detect the emitted signal energy which propagates along the conduit through the water flow 101 as it flows along the conduit 28.

The signal receiver 42 is preferably calibrated to acquire vibroacoustic signals in the specific target baseline frequency band ($f_0$) (receiver mode) and/or its harmonic frequencies ($f_1, f_2 \ldots$) correlated to the preselected emitted baseline frequency. In one possible mode of operation, harmonic frequencies for each baseline output signal are identified by Nyquist-Shannon sampling theorem.

Given $F_0$ the main frequency of a rectangular pulse, and $F_S$ the sampling frequency of the receiving device, the harmonics of the transmitted signal are $II-2*F_0$ $III-3*F_0$ $IV-4*F_0$ $V-5*F_0$ The spectrum of the received target baseline signal will be from 0 to FS/2 in the frequency domain (by Fourier transform), the signal harmonics>FS/2 will be placed in the interval 0-FS/2 according to:

$F_{alias}=F_S/2-(F-F_S/2)=F_S-F$ for $F_S/2<F<F_S$ $F_{alias}=F-F_S$ for $F_S<F<3/2\ F_S$ $F_{alias}=F_S/2-(F-3/2\ F_S)=2\ F_S-F$ for $3/2\ F_S<F<2\ F_S$ Based on the above equations, the harmonic frequencies for each of the output baseline signals may be calculated for $F_S=150$ kHz.
Dataset: W6TX4_20171023_142326
  $F_0$ (main carrier) 48.3 kHz
  II: 53.4 kHz
  III: 69.9 kHz
  IV: 43.2 kHz
  V: 58.5 kHz In the case of water cooled EAF furnace 12 (FIG. 2), the emitted target frequency band is typically in the range of between about 40 to 75 kHz. The applicant has appreciated that depending upon the individual industrial installation, or furnace type, different target frequencies may be selected, depending upon the background noise signal which is generated by the industrial installation during its normal operations. More preferably the signal emitter 38 is operable to produce and emit the specific target sound wave (transducer mode), which is tuned in the processor 44 to the specific propagation characteristics of the cooling conditions being monitored.

Figure 2:
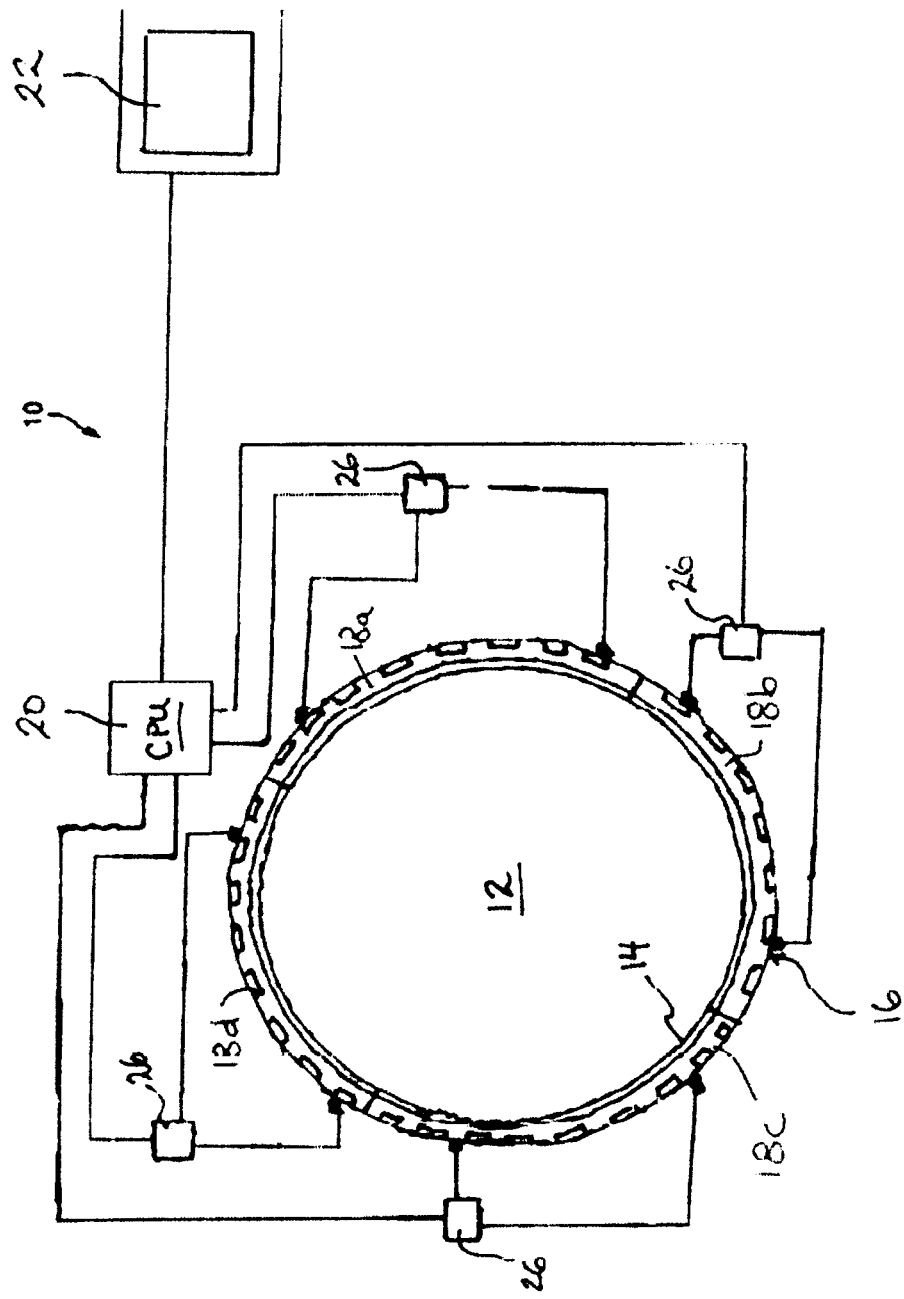
FIG. 2 illustrates schematically a system for EAF furnace shell monitoring and leak detection in accordance with a preferred embodiment of the invention.

Reference may be had to FIG. 2 which illustrates a system 10 for electric arc furnace (EAF) monitoring and coolant leak detection. The system 10 includes an EAF furnace 12 having a furnace sidewall 14 which is cooled by a cooling panel array 16, and a central processing unit (CPU) 20. As will described, the CPU 20 is used to both output control signals regulating the operation of the furnace 12 and its ancillary systems, as well as provide an output to a user display 22 indicative of ongoing furnace operating parameters and conditions.

In the embodiment shown, the cooling panel array 16 is comprised of individual cooling panels 18a,18b,18c,18d. As shown best in FIG. 2, each cooling panel 18 is further provided with an associated water leak detection system 26 which is provided in electronic communication with the CPU 20.

Figure 3:
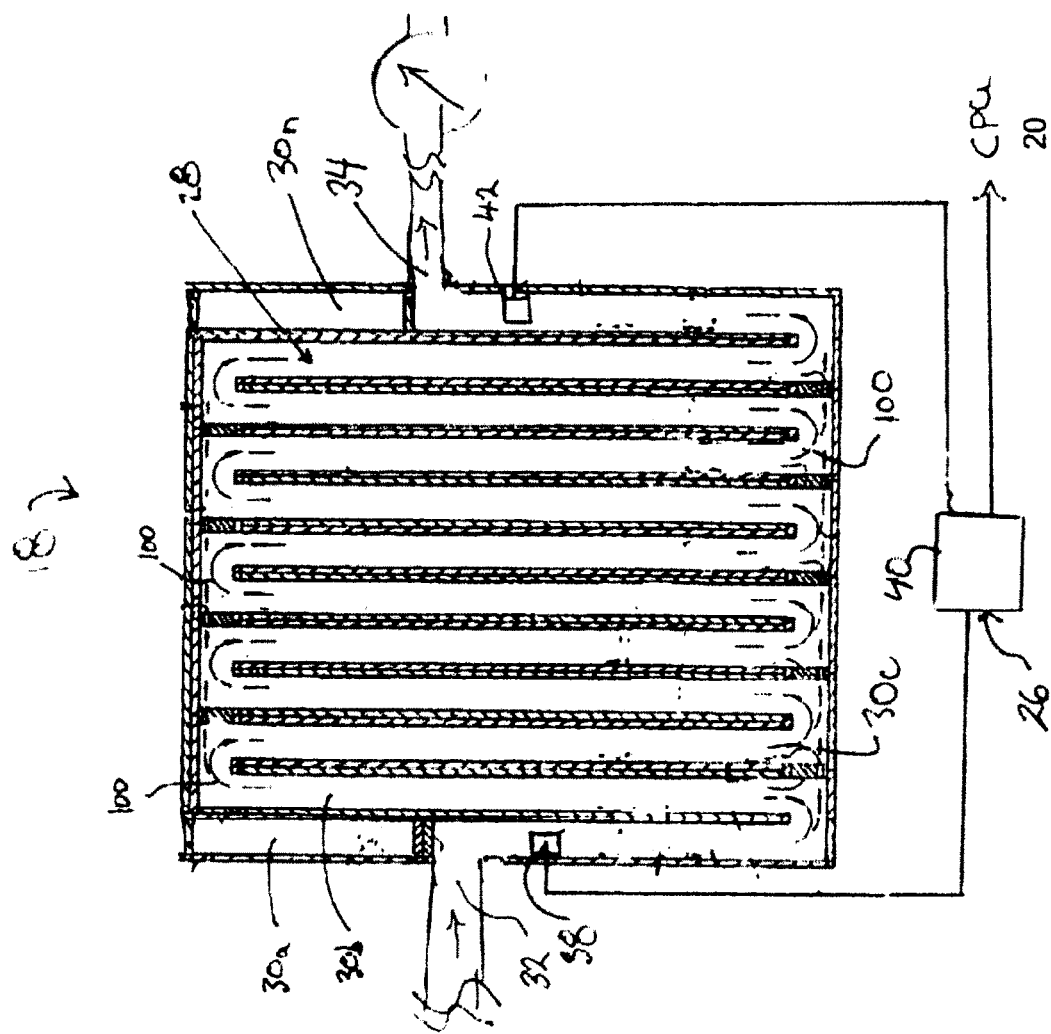
FIG. 3 illustrates schematically a cooling panel used to cool furnace sidewalls in the system of FIG. 2.

More particularly, each cooling panel 18 is provided as a water cooling panel which, for example, is used to form part of the EAF furnace wall 14. As shown in FIG. 3, the panel 18 is provided with a serpentinely extending cooling-fluid conduit 28 which is provided for placement in thermal contact with a portion of the furnace 12 which is to be cooled. The cooling-fluid conduit 28 is formed by the welded connection of a series of generally aligned cylindrical metal cooling pipes 30a,30b,30c . . . 30n which preferably are joined in a substantially side-by-side arrangement, and with the downstream end of each pipe 30 fluidically communicating with the upstream end of the next adjacent pipe 30 by an elbow thereto so as to define a tortuous coolant-fluid flow path 100 therealong. The cooling-conduit 28 extends from an upstream-most fluid inlet 32 through which a flow of coolant water enters the panel 18, to a downstream-most outlet 34. The inlet 32 and outlet 34 are provided in fluid communication with a water cooling circulation system (not shown). The water cooling circulation system controlled by the CPU 20 and operates to pump cooling water as a flow of coolant-fluid through the conduit 28*f* the cooling panel 18. The pumped cooling water flows though and along the metal pipes 30*a*,30*b*,30*c* . . . 30*n* of the cooling flow path 100 to the outlet 34. Preferably, the water cooling circulation system operates to provide the cooling water flow 101 (FIG. 4) along the coolant-fluid flow path 100 as free-surfaceless flow of fluid, whereby the cooling water occupies substantially the entirety of the cooling pipe volume, and not as an open channel flow. On moving from the outlet 34, the warmed water is returned to the water cooling circulation system for chilling and subsequent recirculation.

Figure 4:
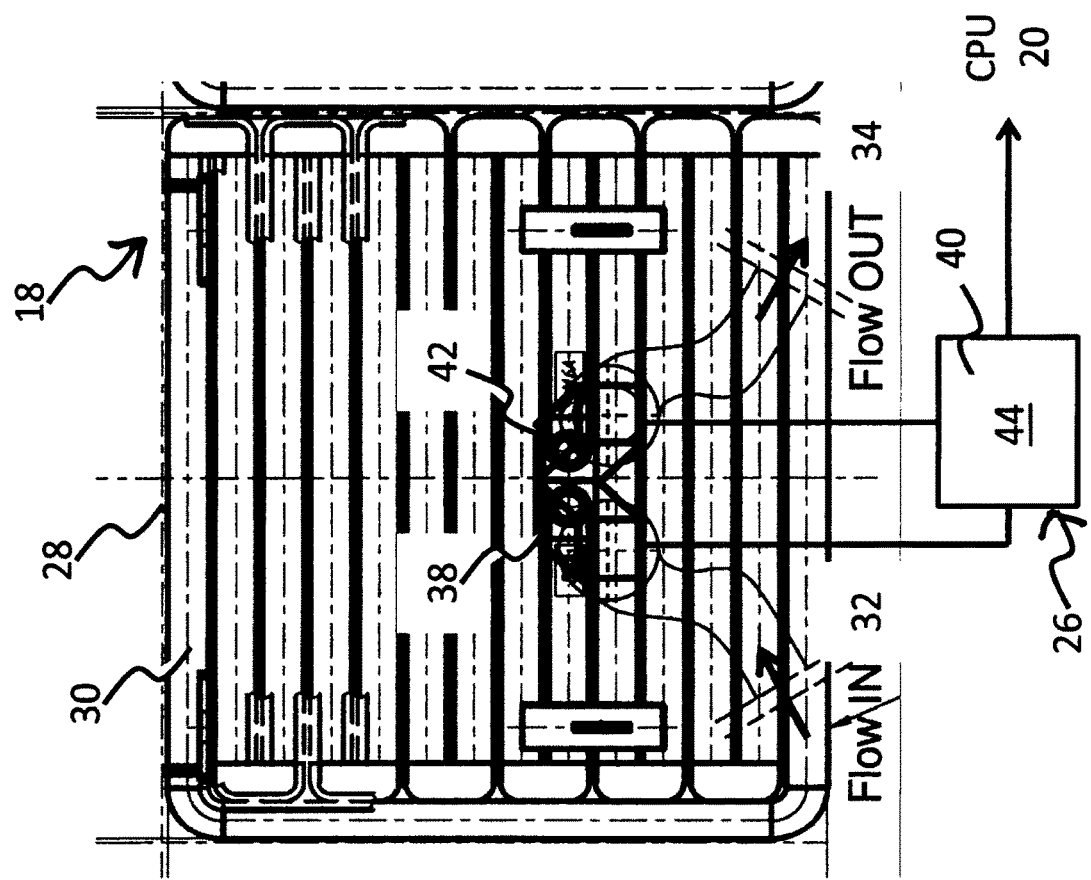
FIG. 4 illustrates schematically a water leak detection system for the EAF furnace cooling panel shown in FIG. 3.
Figure 5:
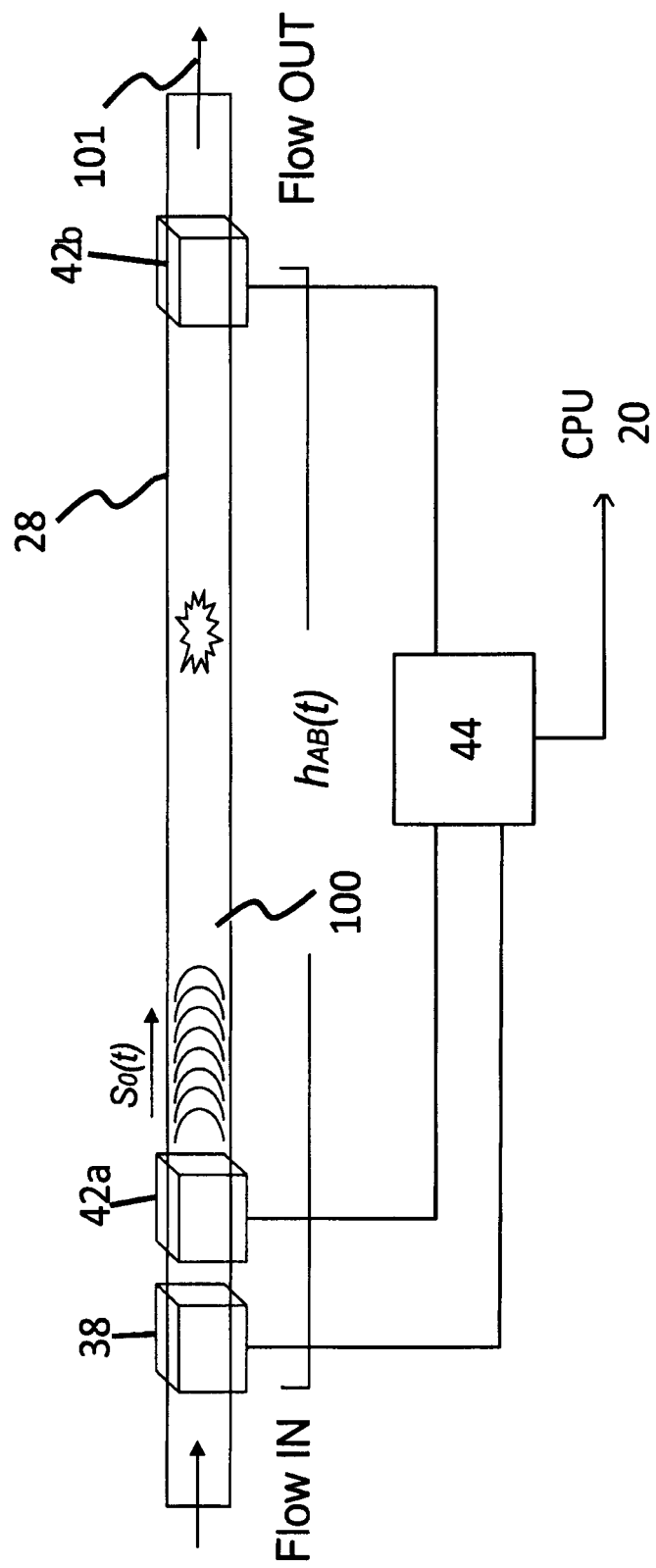
FIG. 5 illustrates schematically the operation of the system shown in FIG. 3 and detecting cooling fluids and water leaks in accordance with a second embodiment of the invention.

FIGS. 3 and 4 illustrate each leak detection system 26 as respectively including an acoustic signal emitter 38 and an acoustic signal receiver assembly 40 which includes at least one acoustic receiver or detector 42. The acoustic detector 42 and emitter 38 are preferably spaced along the conduit 28 a distance from each other about 5 to 50 meters apart. Although not essential, each detection system 26 preferably includes a sensor system processor 44. In a non-limiting aspect the sensor processor 44 may be provided as part of the acoustic signal receiver assembly 40, and which preferably electronically communicates with and controls both the acoustic signal emitter 38 and the acoustic signal detector 42. More preferably, the sensor system processor 44 is further provided in electronic communication with the EAF furnace CPU 20 and operates to output data signals thereto which are representing sensed audio signal components. On receiving output data signals from the panel circuit 18, the CPU 20 operates to provide warning and/or shut down or other control signals to the furnace 12 in the event a water leak in the cooling panel 18 is detected. Alternately, the data signals output by the leak detection system 26 may be transmitted and processed directly in the CPU 20 to provide warning and/or automatic control systems to regulate furnace operation. Although FIG. 1 illustrates an embodiment of the invention in which the acoustic signal receiver assembly 40 includes a single acoustic detector 42, the invention is not so limited. Reference may be had to FIG. 5 which illustrates an alternate embodiment of the invention in which like reference numerals may be used to identify like components. In the construction shown, the acoustic signal receiver assembly 40 is provided with separate acoustic detectors 42*a*,42*b* positioned at spaced locations along the conduit 28.

It is to be appreciated that in an alternate construction, the system 26 could be provided with multiple emitters 38 and/or more signal receivers 42, as well as a single sensor that includes emitting/receiving capabilities. By way of non-limiting example multiple receivers 42 could be provided at differing spaced locations along each pipe 30*a*,30*b*, 30*c* . . . 30*n* of the coolant fluid flow path 100, for identifying variabilities in acoustic signal propagation along different flow path segments. In an alternate possible construction, multiple emitters 38 may be provided to either simultaneously or sequentially emit acoustic signals of different frequencies and/or for different durations for detection by one or more receivers 42.

Figure 6:
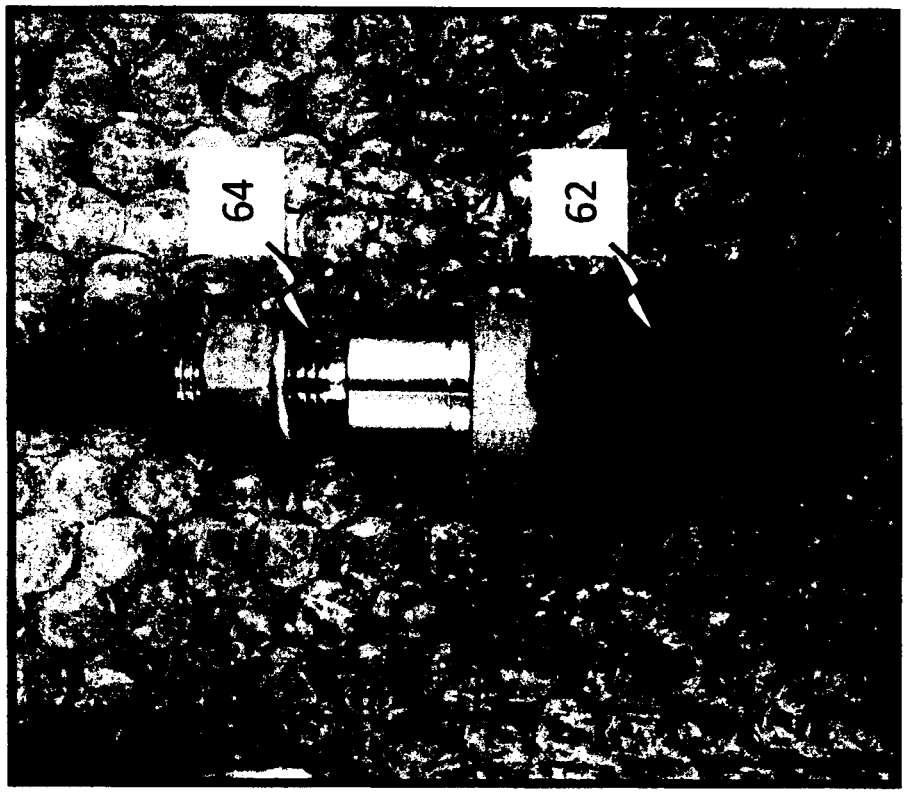
FIG. 6 illustrates an exemplary acoustic signal emitter/transducer used in the emission of a preselected baseline frequency signal in accordance with the preferred embodiment.

FIGS. 6 and 7*a* and 7*b* show a preferred construction of the acoustic signal emitter 38 used in the water detection system 26 shown in FIG. 3; and its placement through the sidewall of a conduit pipe 30. The emitter 38 is provided with a bulb shaped transducer head 62 which is mounted on a forward end of a threaded support column 64. As shown best with reference to FIG. 7*b*, the support column 64 is provided with a length selected so that when the emitter 38 is mounted in hole 70 drilled through the sidewall of the conduit pipe 30, the transducer head 62 locates at a midportion of the water flow 101. The transducer head 62 is provided with a conical or rounded overall profile selected to minimize the creation of turbulent eddies within the conduit 28 as cooling water flow 101 moves therepast. A locking collar assembly 66 consisting of a locking ring 68 and threaded nut 72 are used to fixedly couple the transducer head 62 in the hole 70 formed in the cooling pipe sidewall, so that the signal frequency emitting tip of the transducer 62 locates generally adjacent to a central portion of the cooing fluid stream 101 flow and spaced a distance from the pipe.

Figure 8:
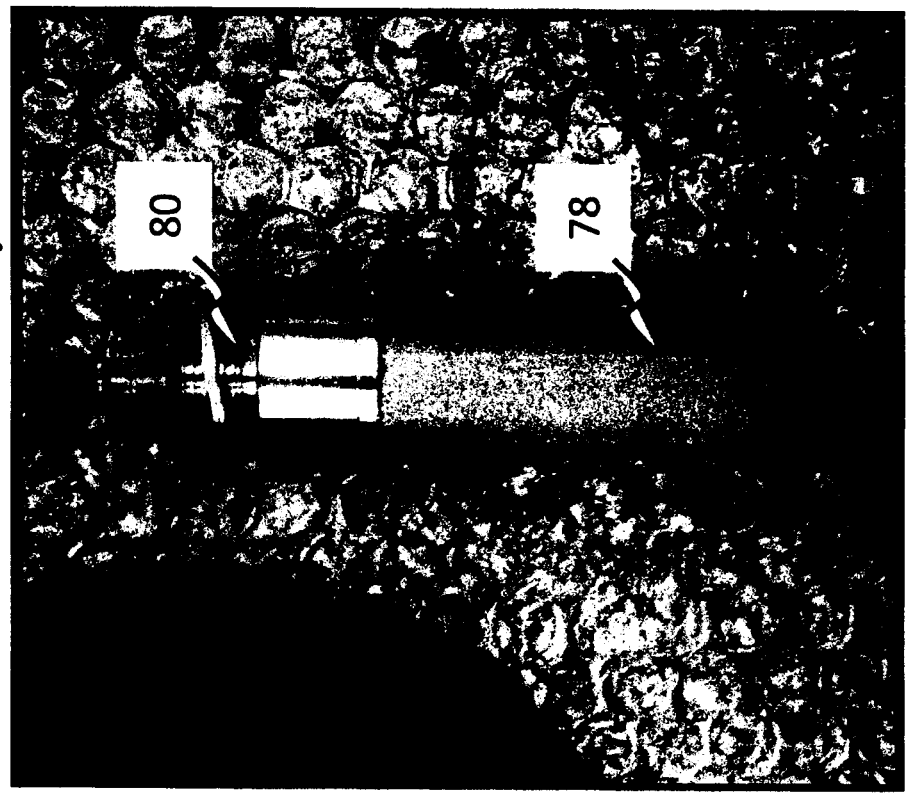
FIG. 8 shows an exemplary acoustic receiver/sensor used in the leak detection system shown in FIG. 3 to sense and detect acoustic signals in the cooling-fluid conduit pipe of the cooling panel.

FIGS. 8, 9*a* and 9*b* show the acoustic detector 42 as including an acoustic signal sensing transducer 78 mounted on a threaded support column 80. The sensing transducer 78 is preferably provided with a cylindrical elongated oval body profile selected to minimize turbulence and the formation of eddy currents in the water flow 101. FIG. 9*b* shows best, a locking ring assembly 82 which includes a locking washer 84 and locking nut 86 as used to mount the acoustic detector 42. The washer 84 and locking nut 86 are used to secure the transducer 78 in a downstream-formed aperture 74 in the sidewall of the pipe 30, with the transducer 78 positioned towards the middle of the pipe 30, and in a mid-portion of the coolant water flow 101, spaced from the pipe sidewall.

In use, the sensor/processor 44 is initially operated to effect the characterization of a baseline acoustic response between signal emitter 38 and the receiver assembly 40 for each cooling panel 18 at normal furnace operating conditions. By processing the sound measurements of the known signal source, the sensor processor 44 may thus process and characterize the acoustic channel response of the intact (not altered) guiding structure of the conduit 28.

By determining the acoustic channel response, the subsequent propagation and measurement of emitted sound signals by the acoustic detectors 42 allows for the analysis of the detected acoustic signals and resulting data to be processed to identify faulty or anomalies in the cooling panel structure occurring between the signal emitter 38 and acoustic detector 42 which may indicate a fracture which may be indicative of a pipe rupture or leak.

In a preferred mode, typical signal processing by the sensor processor 44 and/or CPU 20 may include, but is not limited to signal amplification, time-series analysis, Fourier Transform (including short Fourier Transform), time-frequency analysis, spectral analysis, filtering theory, signal auto and cross correlation. The leak detection system 26 thus exploits the use of acoustic signal receiver detectors 42 which operate to detect and acquire vibroacoustic signals or wave energy at the preselected target frequency travelling within the water flow 101 inside the cooling conduit 28.

Figure 10A:
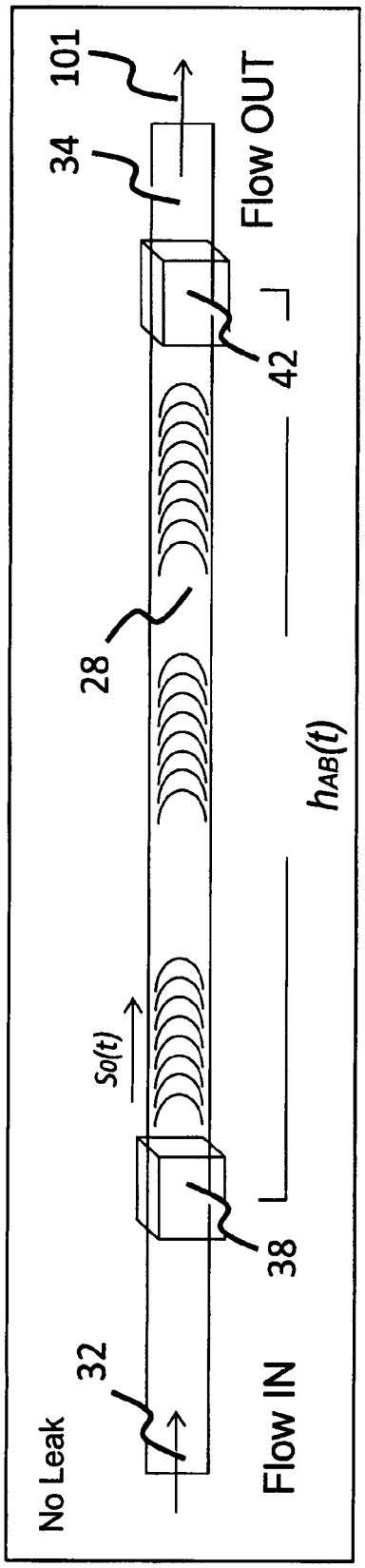
FIGS. 10a and 10b show schematically the transmission and reception of acoustic frequency signals in the detection of water leaks using the system FIG. 3.
Figure 10B:
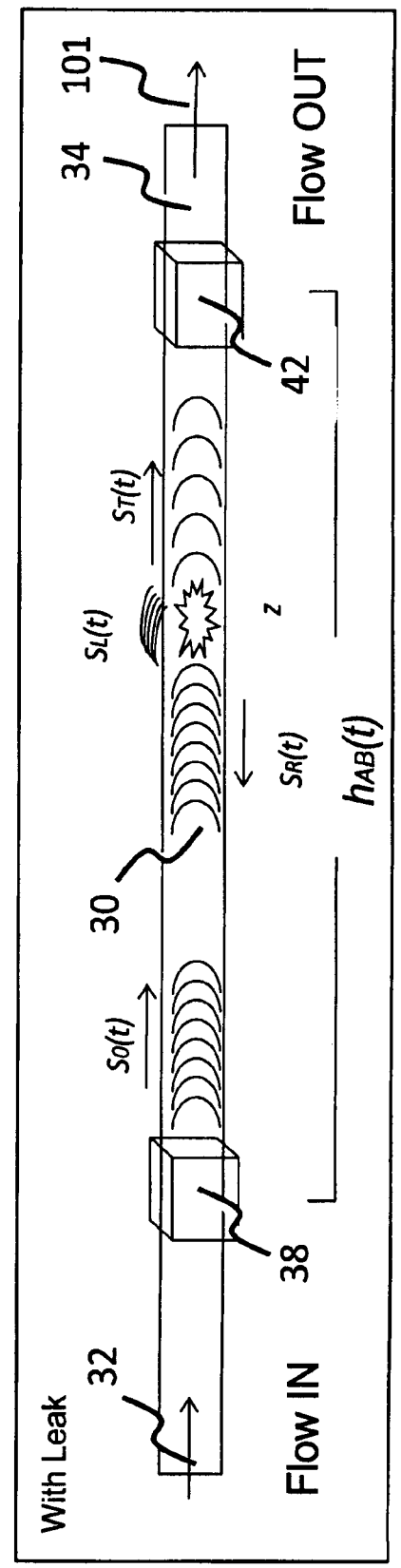

As shown in FIGS. 10*a* and 10*b*, the system 26 operates to emit and transmit acoustic signals at a known preselected frequencies and for chosen pulsed intervals of time to derive the acoustic channel response of the guiding conduit 28 structure. As shown schematically in FIGS. 10*a* and 10*b*, the signal emitter 38 is operable to emit and transmit a predetermined baseline acoustic signal having a preselected waveform at a frequency or frequency band of 10 to 100 kHz. Most preferably, the baseline signal is emitted by the emitter 38 from a point within the water flow 101 flowing within the conduit 28. The emitted baseline frequency propagates through the water flow 101 and along the conduit 28 as an acoustic signal $S_0(t)$ where, at the downstream location it is sensed and detected by the acoustic detector 42. The system 26 is more accurately able to isolate and identify variations in detected signal response due to ruptures or fractures. In particular, the signal emitter 38 and the signal detector 42 operate respectively as active sensors able respectively to transmit (transducer mode) and receive (receiver mode) an acoustic wave in the specific target frequency range. The sensor processor 44 further includes stored software containing a signal processing algorithm to estimate the acoustic channel response between the emitter 38 and acoustic detector 42 and vice-versa. The leak detection algorithm is preferably based on the variation of a detected acoustical signal and/or its harmonic frequencies from a known baseline or source signal (testing wave), and most preferably which has been selected or tuned to be outside of the normal furnace process noise, and preselected as providing superior signal propagation along the conduit 28, as compared to the detected strength of other frequencies detected by the signal detector 42.

FIGS. 10a and 10b show schematically the system in case of no leak and leak situations.

In operation, the acoustic source signal $s_0(t)$ is generated by the signal emitter 38 and propagated directly into and along the cooling water flow 101 travelling in the conduit 28. The signal detector 42 placed towards the outlet end 34 of the conduit 28 receives and measures the propagated source signal and/or its harmonic signals. By comparing the received signal and/or its harmonic signals with the emitted source signal, the acoustic responses $h_{AB}(t)$ of the cooling conduit 28 may be estimated. The channel response may then be used to correlate the propagation features of the signal through cooling water flow 101 as it moves along the flow path 100 in a normal structure. This allows for the reduction in normal acoustic noise from the measurements obtained by signal receivers, and estimate the acoustic channel response $h_{AB}(t)$ from the known source signal $s_0(t)$.

Water leaks, ruptures, or other such anomalies happening at position z between the emitter 38 and a signal detector 42 will result in a distortion of the detected acoustic response $h_{AB}(t)$ recorded at the signal detector 42. The comparison between the measured signals at the signal detector 42 allows the detection of the panel structure anomaly, and the output by the sensor processor 44 and/or CPU 20 of a warning and/or control signal to the furnace 12 indicative and/or responsive to a detected water leak.

Reference may be had to FIGS. 11 to 15 which illustrate graphically sample signal outputs from the water leak detection system 26 in experimental test signals simulating a water fluid leak in an EAF cooling panel. In initial operation, the system 26 was operated using the acoustic signal receiver assembly 40 to identify the background noise signal pattern emitted by the EAF furnace 12 during a normal operation cycle. Shown graphically in FIG. 11, the operation of the EAF furnace 12 during one full heat process, was found to produce a background noise signal in a frequency range of 0 to about 10 kHz. Furthermore, the background noise signal profile was shown to vary with a patterned response having regard to the specific furnace operating stage or parameter, with the background noise frequency signal varying between initial melting and charging and secondary melting refining and processing.

Figure 12:
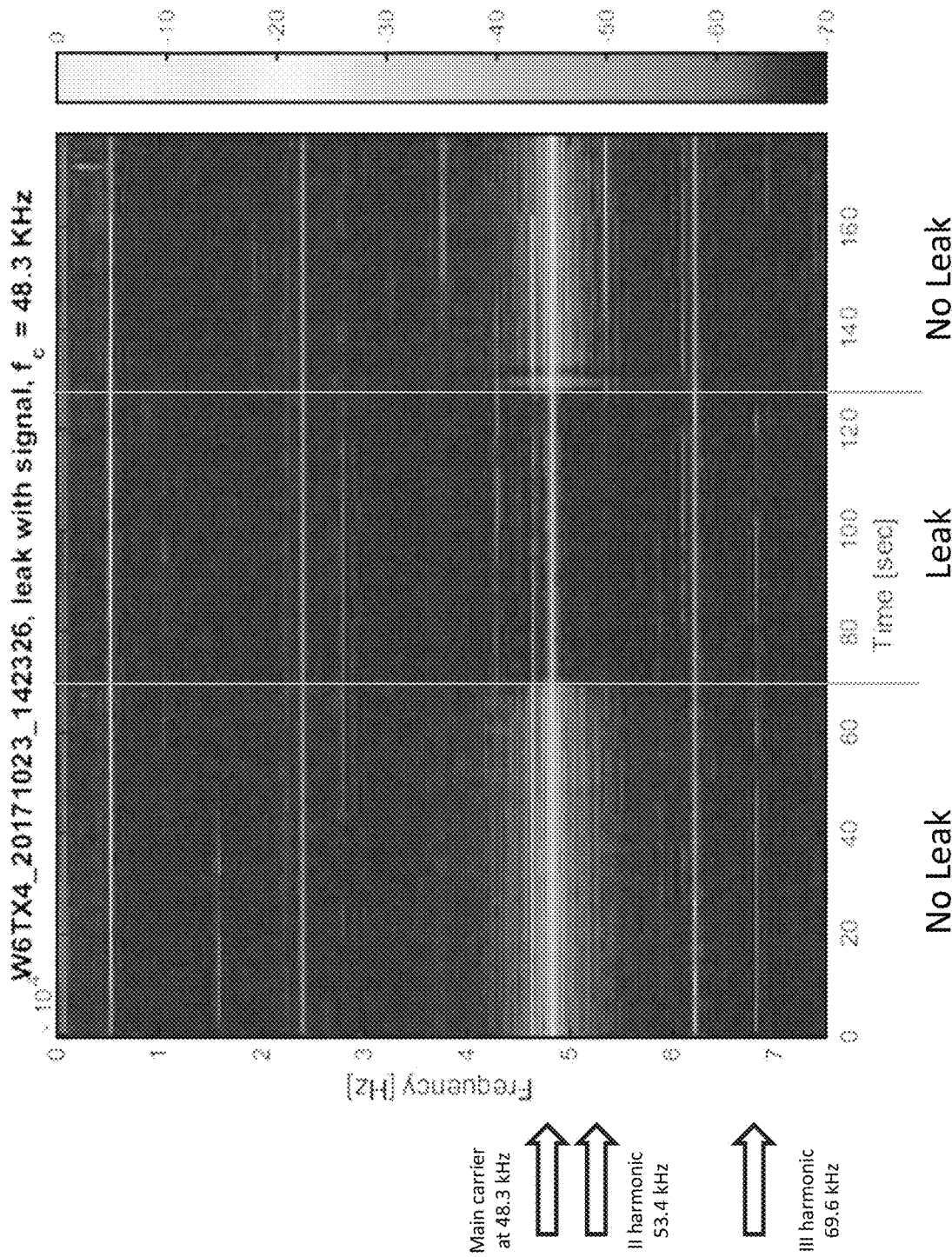
FIG. 12 shows the spectrum analysis illustrating the change in the detected frequency components of an emitted baseline frequency signal in experimental conditions simulating normal and leak/crack conditions.

In experimental testing shown best with reference to FIG. 12, the leak detection system 26 was operated to effect the output by the acoustic signal emitter 38 of predetermined baseline frequencies which were selected in the range of about 48.3, 53.4, 69.6 kHz, and which were chosen above the 0 to 10 kHz background frequency range of the EAF furnace 12. In experimental testing, the signal emitter 38 was used to output the predetermined baseline frequency signals $s_0(t)$ in the cooling water flow 101, the emitted signals detected by the acoustic detector 42 were then transmitted as data to the sensor processor 44.

Figure 13:
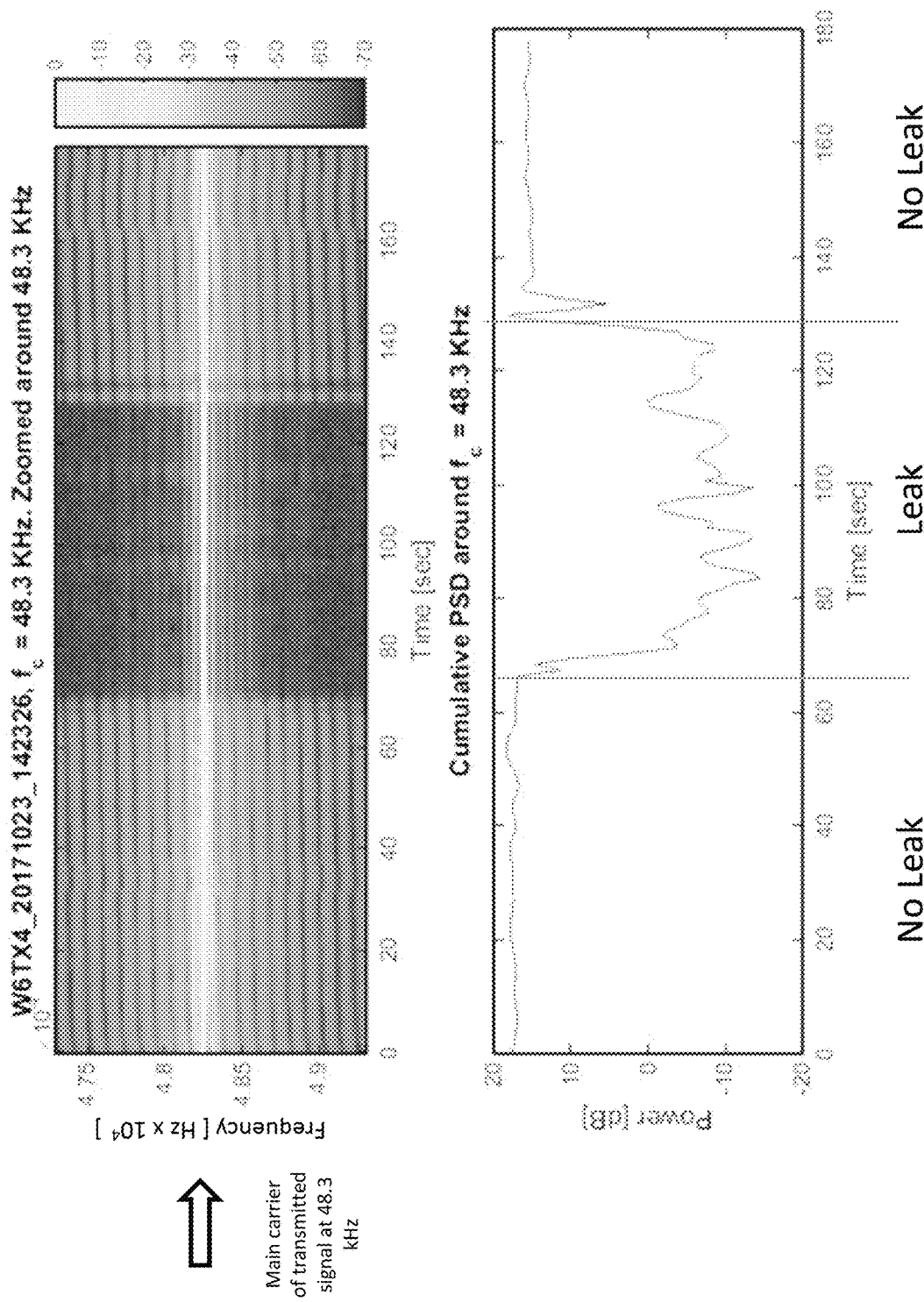
FIGS. 13, 14 and 15 show spectrum analysis illustrating the change in multiple sensed target wave length frequencies which form part of the sensed baseline frequency signal in experimental conditions sealed and simulated leak/crack conditions.
Figure 14:
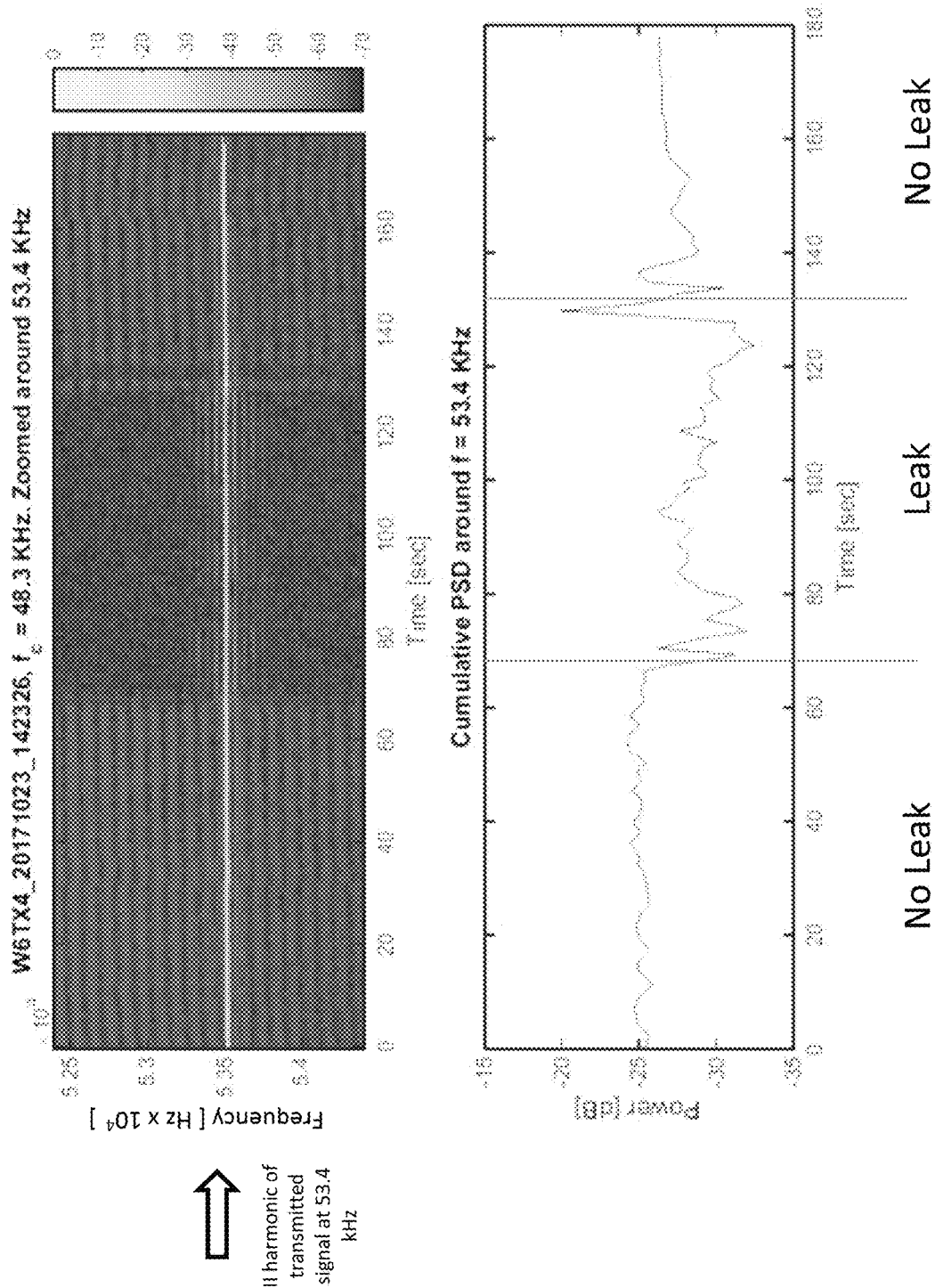
Figure 15:
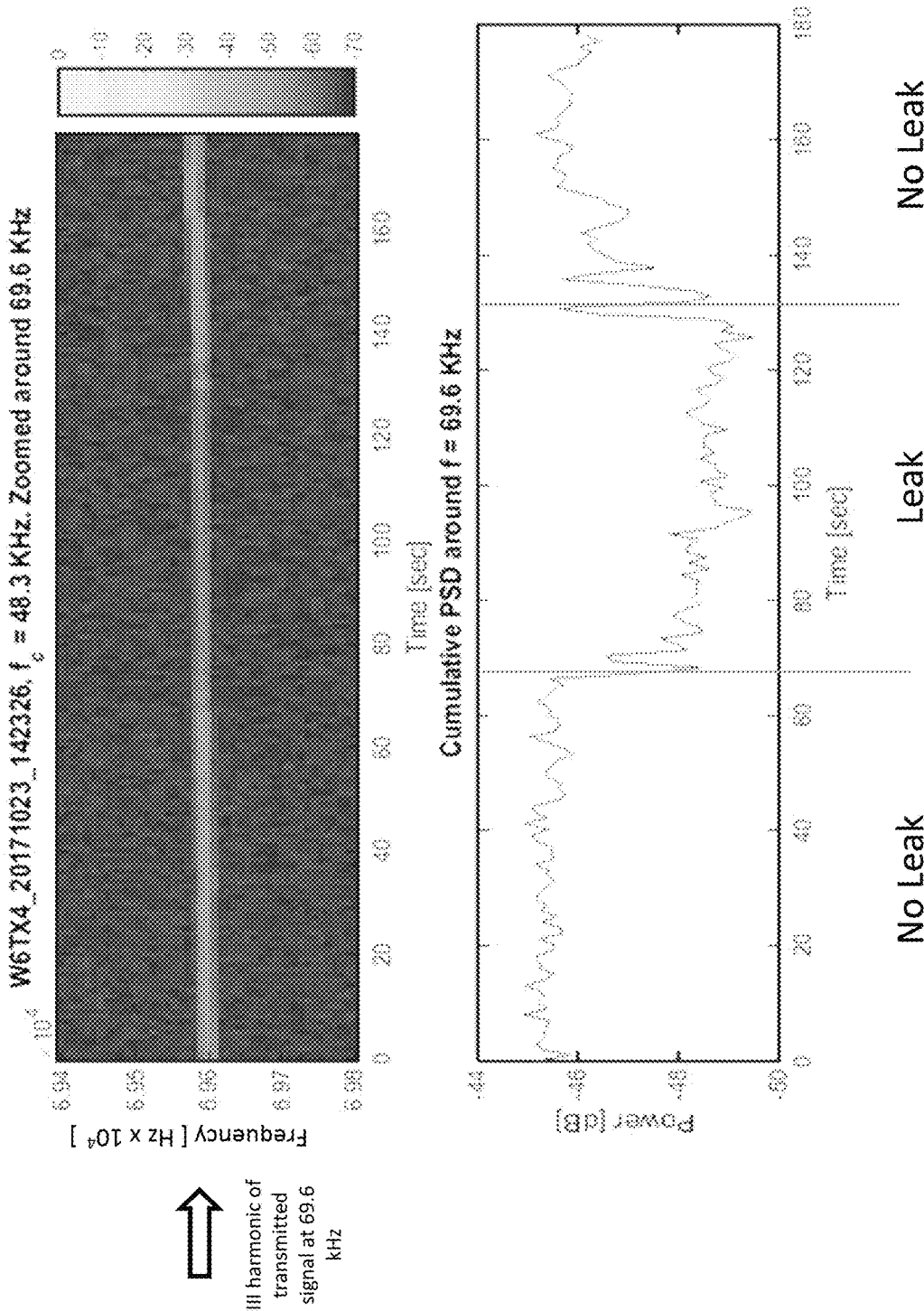

As shown best graphically in FIGS. 13 to 15, the simulation establishes the operability of the water leak detection system 26 to identify potential fluid leaks in the circuit 28. In particular, on the event of a fluid leak or crack, the sensed emitted frequency signal detected by the acoustic sensor 42 illustrated a marked change (i.e. reduction or variation of amplitude) in one or more preselected sensed target frequency peaks contained within the emitted baseline frequency signals. In the test studies simulating pipe leakage, selected target frequencies in ranges of 40,000 to 50,000 Hz; exhibited frequency change in by factors of more than 10; with target frequencies of 50,000 to 70,000 Hz; showed sensed changes of a factor of 2 or more; compared to the detected frequency signal sensed by the receiver under sealed operating test conditions.

It has been recognized that on identifying a change in a sensed target frequencies within the emitted baseline signal, the system may operate to provide to a user or an automatic controller, a signal indicative of a likely fluid leak.

While FIGS. 2 and 3 illustrate the furnace cooling panel 18 as a generally rectangular panel, it is understood and appreciated that in the context of the present invention, the panel 18 could be alternately formed as tube-type EAF furnace cooling duct which, for example, is formed having parallel pipes connected in an end-to-end manner and/or by headers defining a serpentine coolant-fluid flow path, and which for example may form part of an EAF furnace sidewall and/or roof.

Although FIGS. 2 and 3 illustrate the leak detection system 26 as used in detecting coolant water leaks from an EAF furnace cooling panel 18, it is to be appreciated that the present invention is equally operable for detecting fluid leaks in a variety of differing environments. By way of non-limiting example, the leak detection system 26 could be used to detect liquid fluid leaks in liquid conduits or pipes used in industrial installations over a variety of industries and industrial processes. Such possible uses include, without restriction, the detection of leaks in other water heating and/or cooling pipes, oil pipeline applications, and/or in gas or other cooling liquid conduits. It is to be appreciated that in modifying the leak detection system 26 for use in differing industrial installations, a background noise frequency of the installation is first identified, as for example by conventional acoustic monitoring. Thereafter, a target frequency is chosen for emission and propagation by the signal emitter 38 which has a signature profile band width and/or duration which is unique, and which for example allows for the detection, extraction and analysis of an emitted signal frequency component by one or more suitably placed acoustic detectors 42.

The applicant has appreciated that in another operating mode, the system 26 may be used to monitor the ongoing operating parameters of the EAF furnace 12. In particular, the applicant has recognized that the acoustic signal receiver assembly 40 may be used to continuously monitor the background noise which is emitted by the furnace 12. The background noise signals received may be compared with a prestored signal profile which is representative of a background noise profile emitted by the furnace during optimum and/or normal operations. Deviations between the detected background noise signal and the stored background noise signal may advantageously be used to identify other "fault" operating conditions.

Figure 16A:
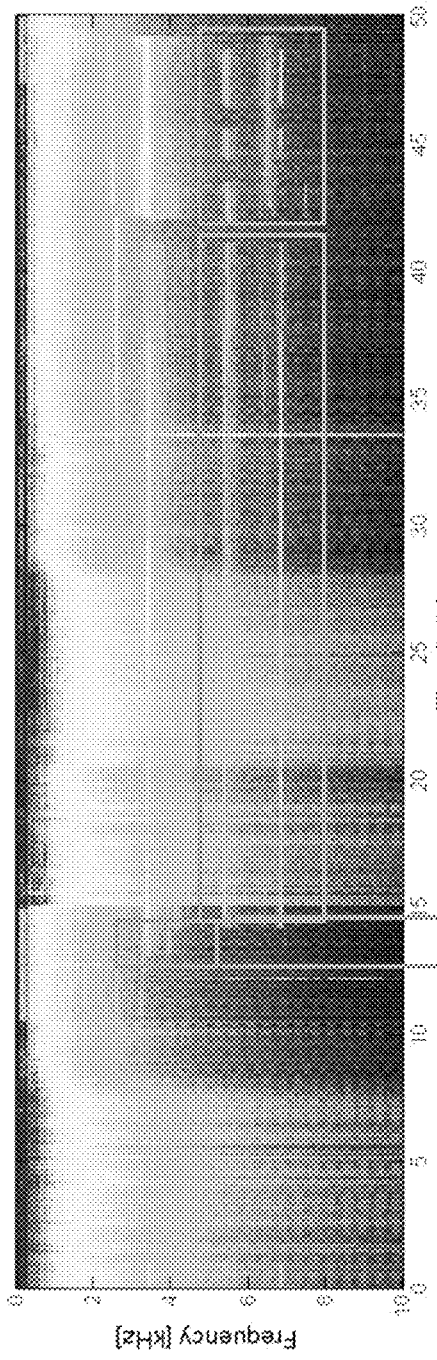
FIGS. 16a and 16b show spectrum analysis of the detected background acoustic signal emitted by the EAF furnace showing the change in signal effect produced by combustion gas flow.
Figure 16B:
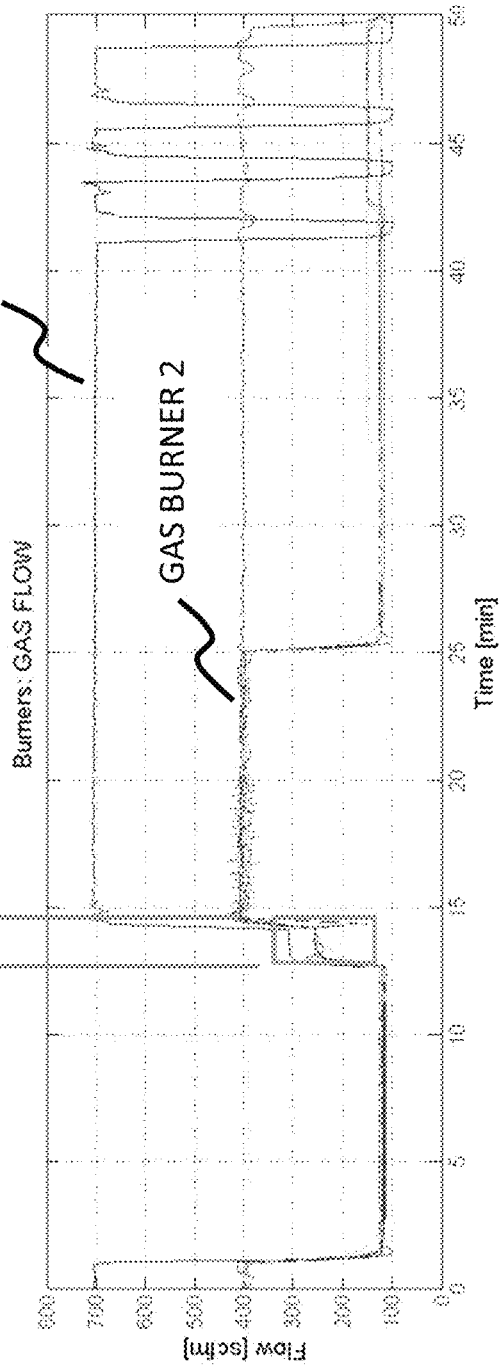

By way of examples, FIGS. 16a and 16b illustrate graphically a detected background noise signal profile for an EAF furnace 12, which illustrates the detected signal component and change represented by combustion gas input at the end of the initial charging cycle.

Figure 17A:
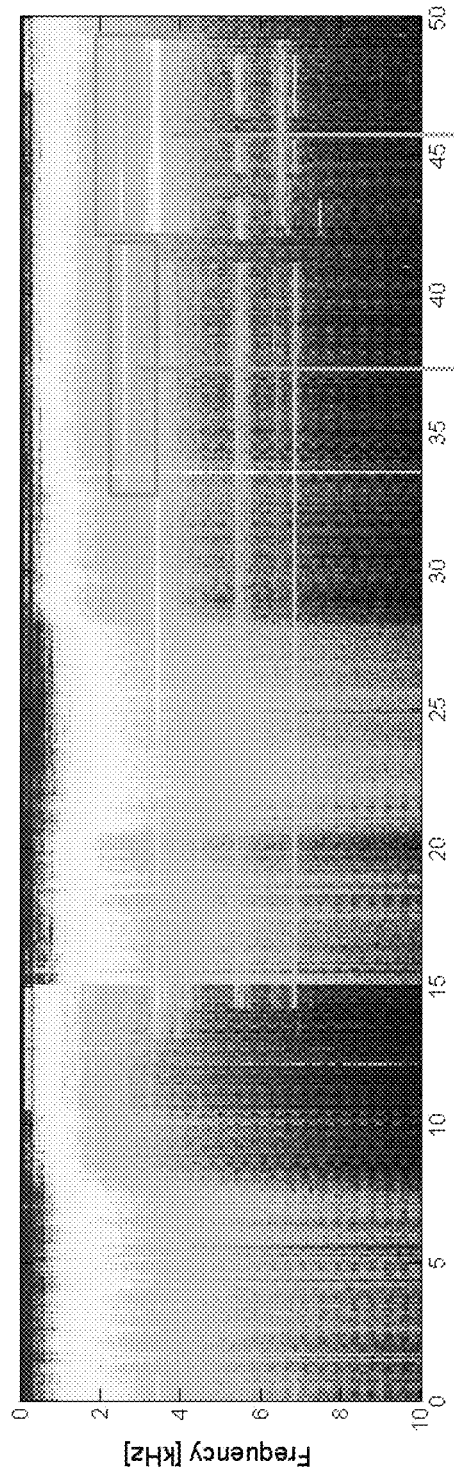
FIGS. 17a and 17b show spectrum analysis of the detected background acoustic signal emitted by the EAF furnace showing the change in signal effected by $O_2$ lance flow.
Figure 17B:
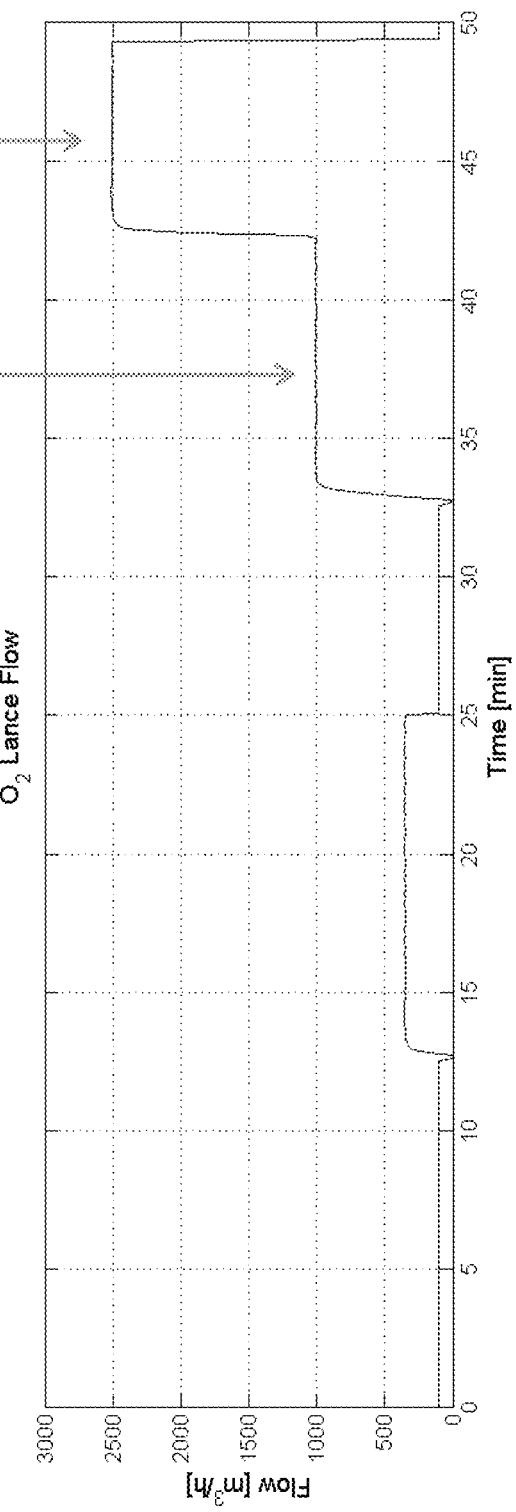
Figure 18A:
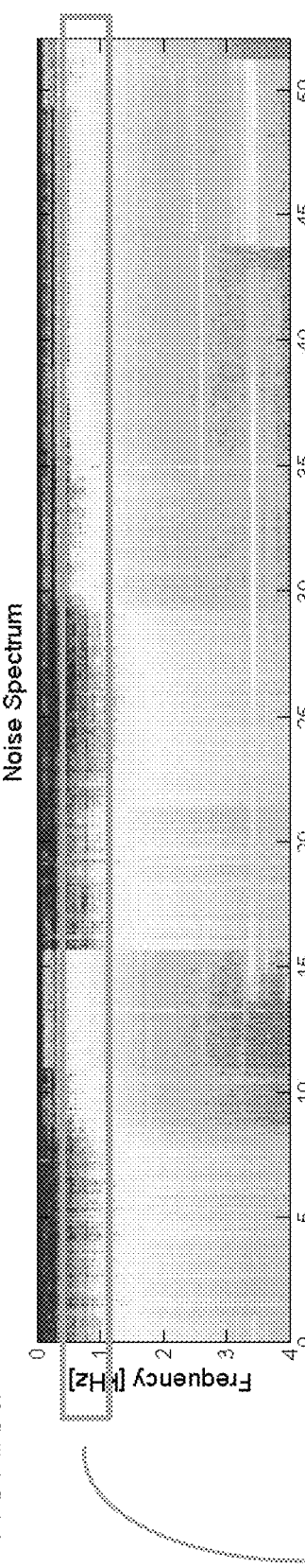
FIGS. 18a to 18c show spectrum analysis of the detected background acoustic signal emitted by the EAF furnace showing the change in signal effected by carbon injection.
Figure 18B:
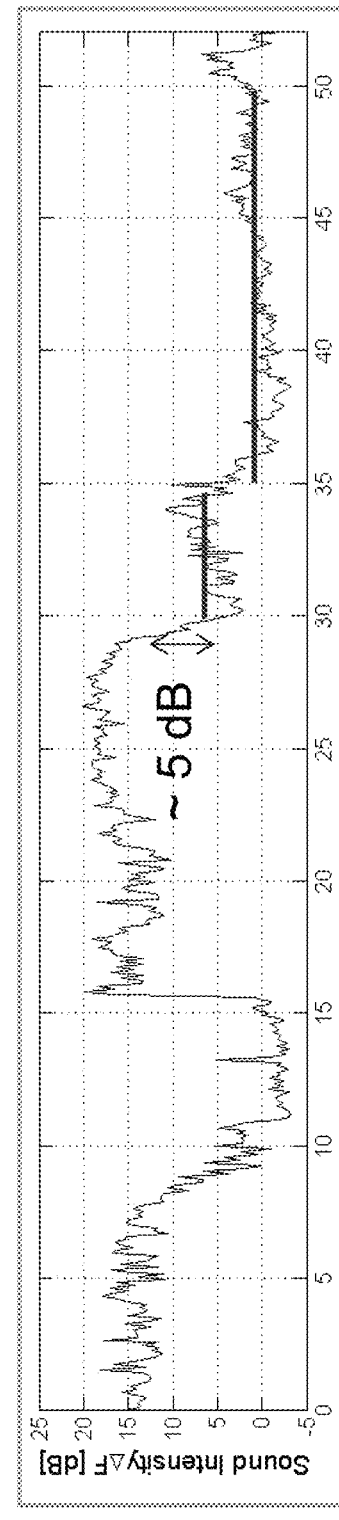
Figure 18C:
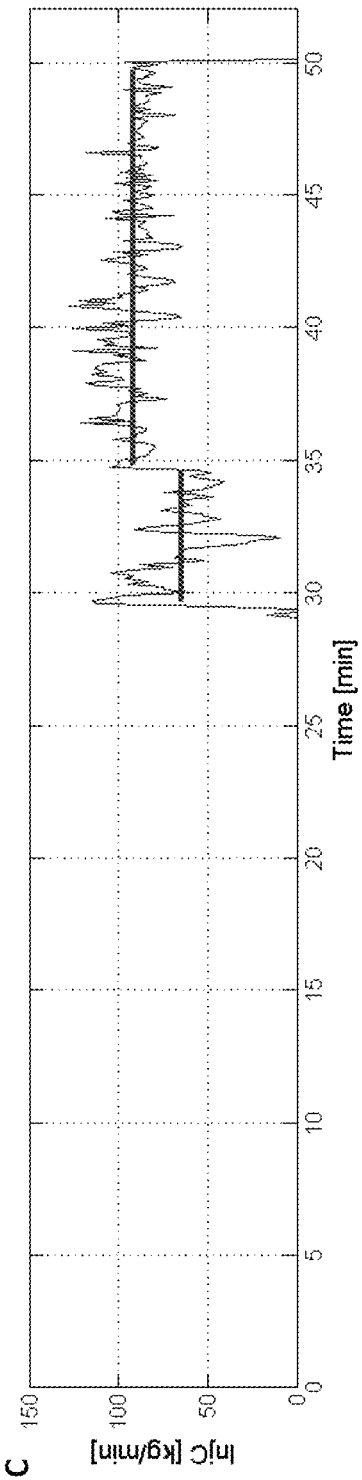
Figure 19A:
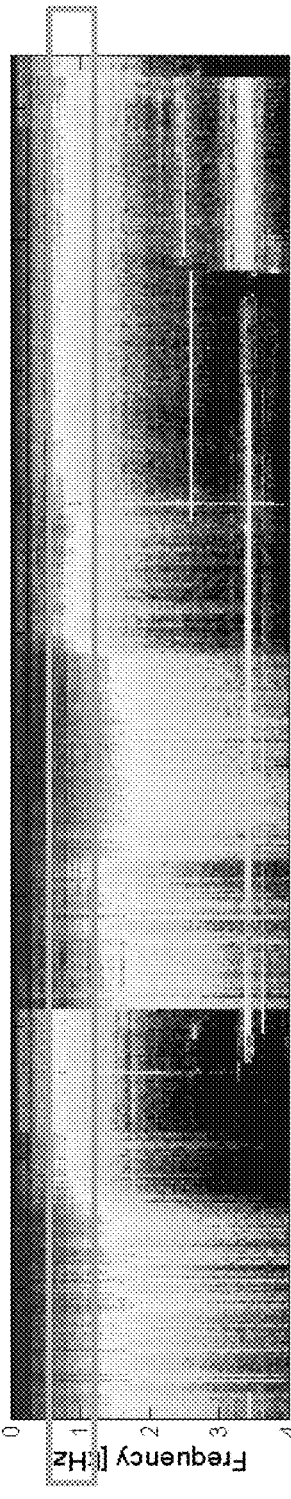
FIGS. 19a to 19c show spectrum analysis of the detected background acoustic signal emitted by the EAF furnace showing the change in signal with arc stability.
Figure 19B:
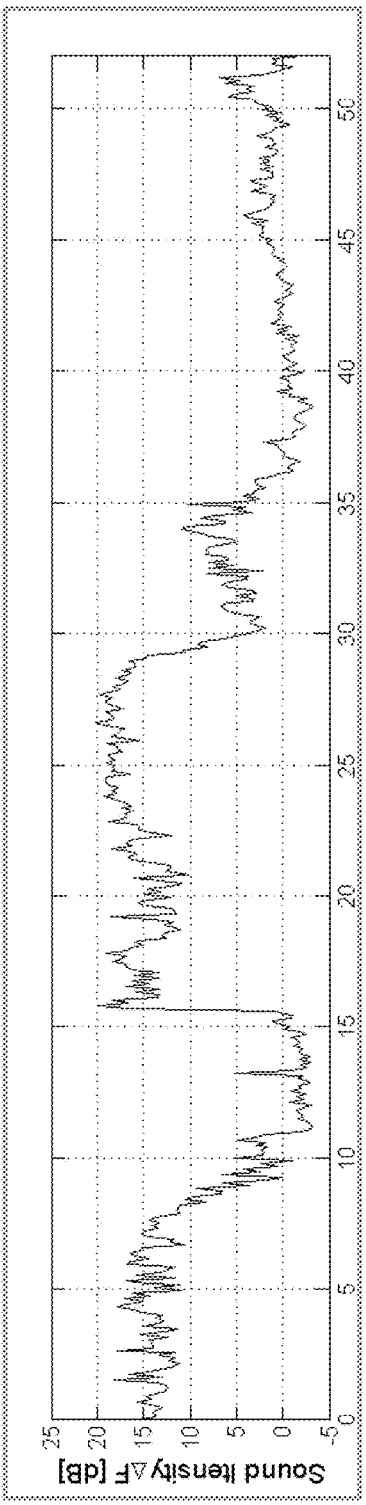
Figure 19C:
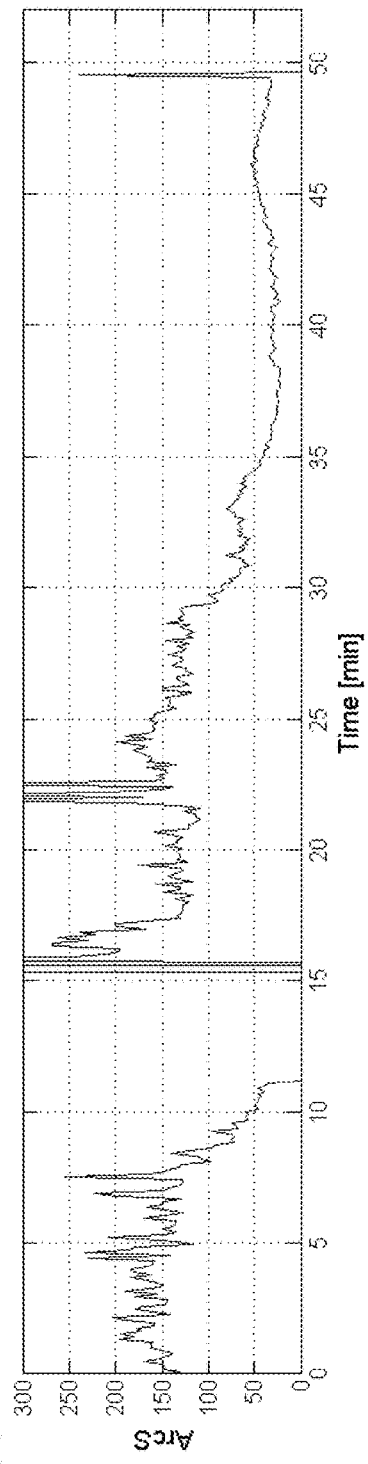

FIGS. 17a and 17b illustrate graphically the change in detected noise signal frequencies represented by the introduction of oxygen through the furnace oxygen lance during refining and end operations. FIGS. 18a to 18c and 19a to 19c illustrate graphically measured noise spectra and the change in detected noise signal frequencies and sound intensity measured with carbon injection and furnace arc stability factor during furnace operation. The applicant has appreciated that deviations in the detected signal, as compared to a conventional or baseline signal profile, could be used to identify lance wear issues and/or incomplete oxygen injection.

While the detailed description describes each cooling panel 18 as having its own signal emitter 38 and processor 44, the invention is not so limited. In another embodiment it may be possible to use a single signal emitter 38 or sound source and/or signal sensor processor 44 for monitoring multiple cooling panels 18. The signal processing allows for the identification of water leaks between the emitter and acoustic detectors and/or in the case of multiple detectors 42, between any two signal detector/receivers.

Although the detailed description describes various preferred embodiments in accordance with the best mode of the invention, the invention is not strictly limited to the express construction which is described. Many variations and modifications will now occur to persons skilled in the art.

We claim:

1. A method of controlling an industrial installation, the industrial installation including:
   fluid cooled equipment;
   a cooling fluid circuit, thermally communicating with the fluid cooled equipment, and having a conduit having a free-surfaceless flow of cooling fluid therealong;
   a fluid leak detection system comprising an acoustic emitter, positioned at a first location along said conduit;
   an acoustic sensor positioned at a second location along said conduit spaced from said first location; and
   an installation processor electronically communicating with the acoustic sensor and operable to output control signals to control at least one operating parameter of the industrial installation,
   the acoustic emitter operable to output and propagate at least one output acoustic signal along said free-surfaceless flow, the at least one acoustic signal including one or more preselected baseline frequency components;
   the acoustic sensor operable to receive and sense the at least one output acoustic signal to detect a change in at least one said preselected baseline frequency component or a harmonic frequency correlated to the at least one preselected baseline frequency component,
   the method comprising:
      outputting from the acoustic emitter at least one said acoustic signal, so as to propagate along said conduit, the output acoustic signal including at least one preselected baseline frequency components having at least one frequency or frequency band detectable by the acoustic sensor,
      the baseline frequency component being selected whereby a conduit fluid leak results in a threshold change in the at least one frequency or frequency band,
   with the acoustic sensor, detecting the output acoustic signal; and
   wherein on identifying the threshold change in the frequency or frequency band in the detected acoustic signal, outputting at least one said control signal from said installation processor to control at least one said operating parameter; and
   wherein the step of identifying the threshold change in the frequency or frequency band comprises effecting a short time Fourier Transform of the detected acoustic signal.

2. The method as claimed in claim 1, wherein said output acoustic signal comprises a pulsed signal having a pulse duration selected at between about 0.25 and 3 minutes and a pulse repetition time of between about 1 and 5 minutes.

3. The method as claimed in claim 1, wherein the step of identifying a change in the one or more frequency bands comprises comparing the preselected baseline frequency component of detected output acoustic signal with a known baseline source signal of the industrial installation during a normal operation cycle.

4. The method as claimed in claim 1, comprising outputting from the installation processor said at least one control signal on identifying a change in at least one preselected frequency component in the baseline frequency bands beyond a preselected threshold amount.

5. The method as claimed in claim 1, wherein the preselected baseline frequency component is selected with a frequency range of between 10 kHz and 100 kHz and preferably between 48 kHz and 70 kHz.

6. The method as claimed in claim 1, wherein said acoustic sensor is spaced along said conduit from said acoustic emitter by a distance of between about 5 and 50 meters, and further wherein the acoustic emitter is operated to emit said output acoustic signal directly into and along the free-surfaceless flow.

7. The method as claimed in claim 1, wherein identifying the threshold change in the frequency or frequency band further comprises, identifying a background noise signal pattern emitted by the installation during a normal operation cycle, and
   correlating the detected output acoustic signal with the background noise signal pattern and reducing normal acoustic noise components from the detected output acoustic signal.

8. The method as claimed in claim 1, wherein the industrial installation comprises an industrial steel making furnace, and the output control signal comprises a furnace operation control or furnace warning signal control.

9. The method as claimed in claim 1, further comprising selecting the preselected baseline frequency components by the steps of:
   outputting from said acoustic emitter, a plurality of test acoustic signals,
   said test acoustic signals comprising a plurality of individual output frequencies;
   sensing said test acoustic signals by said acoustic sensor; and
   selecting said at least one preselected baseline frequency component on the basis of relative signal propagation strength of the test acoustic signals detected by the acoustic detector.

10. The method as claimed in claim 1, further wherein said second location is spaced from said first position in a direction of said free-surfaceless flow.

11. The method as claimed in claim 1, further comprising positioning at least one of said acoustic sensor and said acoustic emitter, towards a mid-portion of said free-surfaceless flow at a location spaced from a sidewall of said conduit.

12. A method of controlling an industrial furnace installation, the industrial furnace installation including:
an industrial furnace component;
a cooling circuit provided in thermal communication with the industrial furnace component the cooling circuit including a fluid conduit for receiving a cooling fluid flow therealong;
a fluid conduit leak detection system comprising,
an acoustic emitter positioned at a first location along said conduit; and
an acoustic sensor positioned at a second location along said conduit spaced from said first position,
a processor electronically communicating with the acoustic sensor and operable to output control signals to control at least one operating parameter of the industrial furnace installation,
the acoustic emitter operable to output and propagate at least one output acoustic signal through said cooling fluid flow, the at least one acoustic signal including one or more preselected frequency components, the preselected frequency components having a frequency range selected to preferentially propagate along said conduit to said acoustic sensor,
the acoustic sensor operable to receive and sense the at least one output acoustic signal to detect the at least one said preselected frequency component or a harmonic frequency correlated to the at least one preselected frequency component,
the method comprising:
the acoustic emitter outputting into and along the cooling fluid flow at least one said acoustic signal,
with the acoustic sensor, detecting the output acoustic signal; and
wherein on identifying in the detected acoustic signal a threshold change in one or more frequency bands in the frequency component or the harmonic frequency correlated to at least one said preselected frequency component, outputting at least one said control signal from said processor; and
wherein the step of identifying the threshold change in the one or more frequency bands or the harmonic frequency comprises effecting a short time Fourier Transform of the detected acoustic signal.

13. The method as claimed in claim 12, wherein the at least one operating parameter is selected from the group consisting of a warning status indicator, an automatic safety protocol, and a furnace operation control.

14. The method of claim 12, wherein the cooling fluid flow comprises a substantially free-surfaceless coolant-water flow, and said method further includes positioning said acoustic emitter directly in the coolant-water flow to emit said acoustic signal at a location spaced from a sidewall of a fluid conduit.

15. The method as claimed in claim 12, wherein the processor outputs said at least one control signal on identifying a change in at least one preselected frequency component in the detected output frequency bands beyond a preselected threshold amount.

16. The method as claimed in claim 14, wherein a frequency range of the preselected frequency component and/or the harmonic frequency correlated to the preselected frequency component is selected at between 10 kHz and 100 kHz, and preferably between 48 kHz and 70 kHz.

17. The method as claimed in claim 16, wherein the step of identifying the threshold change in the one or more frequency bands further comprises comparing detected acoustic signal frequency bands with a background noise signal pattern of the industrial furnace installation during a normal operation cycle.

18. The method as claimed in claim 12, further comprising outputting said at least one output acoustic signal as a pulsed signal having a pulse duration selected at between about 0.25 and 3 minutes and a pulse repetition time of between about 1 and 5 minutes.

19. The method as claimed in claim 18, wherein said cooling fluid flow is a substantially free-surfaceless flow, the acoustic sensor is spaced along said conduit from said acoustic emitter in a direction of said free-surfaceless flow by a distance of between about 5 and 50 meters, and wherein the acoustic emitter is operated to emit said output acoustic signal directly into and along the free-surfaceless flow.

20. The method as claimed in claim 12, further comprising selecting the preselected frequency components by the steps of:
outputting from said acoustic emitter, a plurality of test acoustic signals, said test acoustic signals comprising a plurality of individual output frequencies;
sensing said test acoustic signals by said acoustic sensor; and
selecting said at least one preselected frequency component on the basis of relative signal propagation strength in the cooling fluid flow.

21. A method controlling a steel making furnace installation, the steel making furnace installation including:
an electric arc furnace, and
a cooling panel, thermally communicating with a sidewall portion of the electric arc furnace,
the cooling panel including a conduit for receiving a flow of cooling fluid flow therealong,
a fluid leak detection system comprising an acoustic emitter, an acoustic sensor, and a processor electronically communicating with the acoustic sensor, the acoustic emitter being operable to output and propagate an acoustic signal in said cooling fluid flow, the sensor being operable to receive and sense the emitted acoustic signal, the processor being operable to output control signals to control at least one operating parameter of the steel making furnace installation,
the acoustic signal including at least one preselected frequency components or at least one harmonic frequency correlated to said preselected frequency components,
the method comprising:
positioning the acoustic emitter at a first location along said conduit to output said acoustic signal along a central portion of said cooling fluid flow spaced from the conduit sidewall,
positioning the acoustic sensor at a downstream location along said conduit, spaced from the acoustic emitter to receive and sense the output acoustic signal at the central portion of said cooling fluid flow,
providing the cooling fluid flow along the conduit as a substantially free-surfaceless flow,
from the acoustic emitter outputting the acoustic signal so as to propagate through said cooling fluid flow and along said conduit,
with the acoustic sensor, detecting the output acoustic signal, and
on identifying in the detected acoustic signal, a threshold change at least one said frequency component or harmonic frequency of said frequency component, outputting said control signals, and wherein the step of identifying the threshold change in the frequency component or harmonic frequency comprises effecting a short time Fourier Transform of the detected acoustic signal.

22. The method as claimed in claim 21, further comprising periodically recalibrating the output acoustic signal by the steps of:
   outputting from the acoustic emitter, a plurality of test acoustic signals across a frequency spectrum range,
   detecting and sensing the test acoustic signals by the acoustic sensor to identify detected test signal strength, and
   selecting a next output acoustic signal on the basis of the detected test signal strength.

23. The method as claimed in claim 22, wherein said output acoustic signal comprises a pulsed signal having a pulse duration selected at between about 0.25 and 3 minutes and a pulse repetition time of between about 1 and 5 minutes.

24. The method as claimed in claim 23, wherein the at least one operating parameter is selected from the group consisting of a warning status indicator, an automatic safety protocol, and a furnace installation control signal.

* * * * *